United States Patent
Fogu et al.

(10) Patent No.: US 11,032,222 B2
(45) Date of Patent: Jun. 8, 2021

(54) NOTIFYING USERS OF OFFENSIVE CONTENT

(71) Applicant: Facebook, Inc., Menlo Park, CA (US)

(72) Inventors: Francesco Fogu, San Francisco, CA (US); Mindi Yuan, Mountain View, CA (US); Yoav Shapira, Palo Alto, CA (US); Alana Conner, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/548,683

(22) Filed: Aug. 22, 2019

(65) Prior Publication Data

US 2021/0058352 A1    Feb. 25, 2021

(51) Int. Cl.
| | |
|---|---|
| *G06F 15/16* | (2006.01) |
| *H04L 12/58* | (2006.01) |
| *G06Q 50/00* | (2012.01) |
| *G06N 20/00* | (2019.01) |
| *G06F 9/54* | (2006.01) |
| *G06F 40/279* | (2020.01) |

(52) U.S. Cl.
CPC ............. *H04L 51/12* (2013.01); *G06F 9/542* (2013.01); *G06F 40/279* (2020.01); *G06N 20/00* (2019.01); *G06Q 50/01* (2013.01); *H04L 51/32* (2013.01)

(58) Field of Classification Search
CPC ....... H04L 51/12; H04L 51/32; H04L 51/063; G06N 3/08; G06N 20/00; G06Q 50/01
See application file for complete search history.

(56) References Cited

U.S. PATENT DOCUMENTS

| | | | |
|---|---|---|---|
| 9,524,490 B2 | 12/2016 | Rubinstein et al. | |
| 9,959,250 B2 | 5/2018 | Marra et al. | |
| 2013/0238318 A1* | 9/2013 | Enoki | G06F 40/284 704/9 |
| 2016/0294755 A1 | 10/2016 | Prabhu | |
| 2019/0121866 A1* | 4/2019 | Garg | H04L 51/16 |
| 2019/0297042 A1* | 9/2019 | Prabhu | G06F 3/04817 |
| 2020/0142999 A1* | 5/2020 | Pedersen | G06F 16/35 |
| 2020/0196011 A1* | 6/2020 | Wyatte | A63F 13/79 |

OTHER PUBLICATIONS

EP Search Report for Application No. 20190119, dated Sep. 17, 2020, 8 pages.
Anonymous, "Optical Character Recognition—Wikipedia," Jul. 13, 2019, XP055724546, Retrieved from the Internet: URL:https://en.wikepedia.org/w/index.php? title=Optical_character_recogniation &oldid=906050239 [retrieved on Aug. 24, 2020], 11 pages.

* cited by examiner

*Primary Examiner* — Yves Dalencourt
(74) *Attorney, Agent, or Firm* — Lee & Hayes, P.C.

(57) ABSTRACT

Techniques are described that determine when content to be shared by a user may be offensive, and providing the user with a notification that the content may be offensive. In some examples, the user may be provided with a notification that includes a selectable option allowing the user to withdraw or undo the content from being shared, additional information regarding why the content was determined to be offensive, content sharing guidelines, and/or advice for how to revise the content to be less offensive. In some examples, the notification may be presented for a predetermined period of time, and the content may be held in a pending state and not shared with other users until expiration of the predetermined period.

20 Claims, 11 Drawing Sheets

NOTIFYING USERS OF OFFENSIVE CONTENT

BACKGROUND

Digital platforms such as text messaging, instant messaging, email, social media, gaming, or other applications by which users can share content provide users with numerous benefits and opportunities. For instance, users may share information, media, and other types of content with family, friends, colleagues, and even strangers. However, the freedom associated with sharing content via these digital platforms is not without problems. For example, users may share offensive content, such as insults, hate speech, nudity, threats, violence, and so forth, either directly to other specific users or publicly. In many cases, offensive content can have negative, serious, and lasting consequences for both the person sharing the content and consumers of the content including hurt feelings, reputational damage, and in more extreme cases depression, substance use, and suicide. Controlling how and whether offensive content is shared on digital platforms may present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
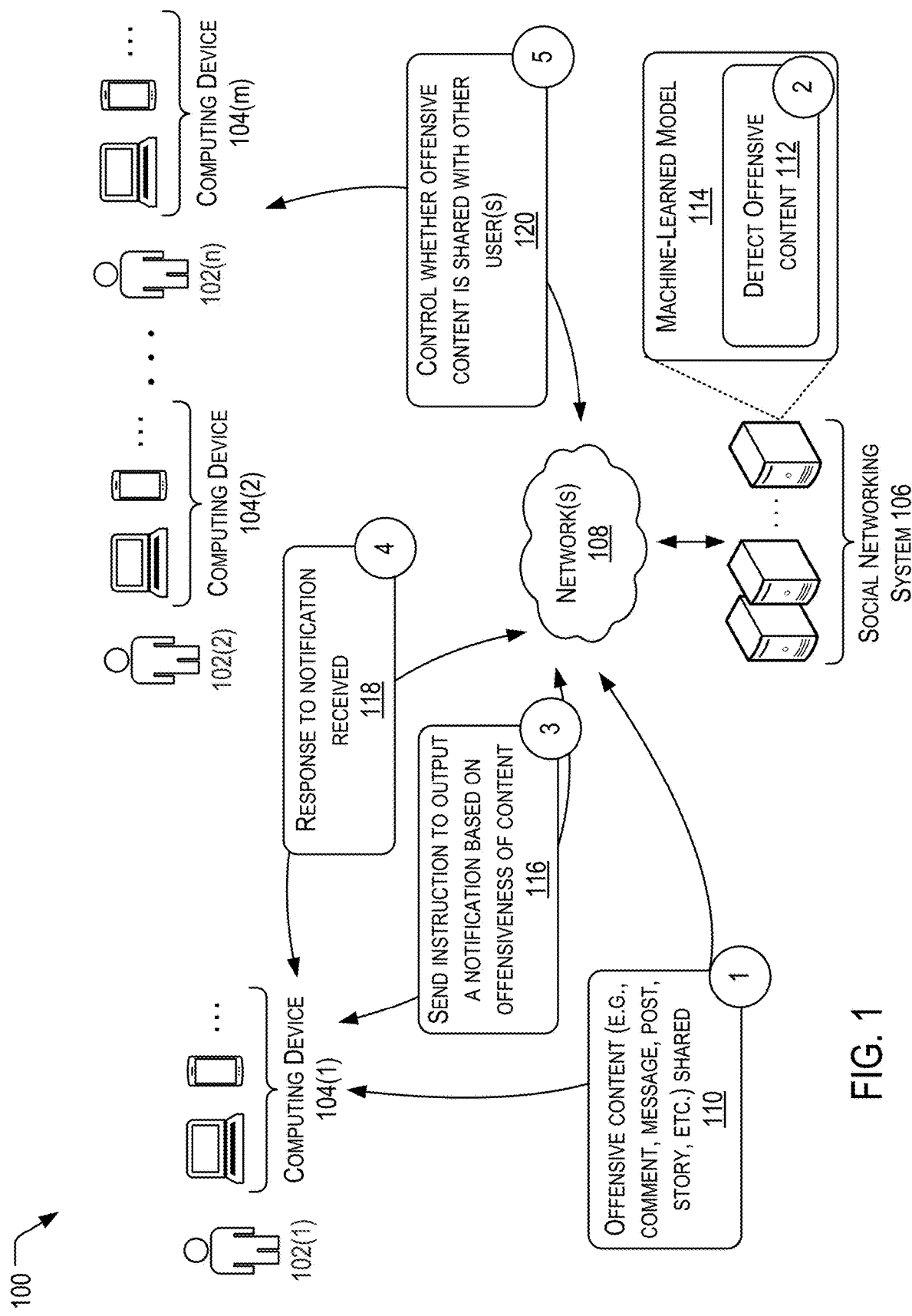
FIG. 1 is a schematic view of an example system usable to implement example techniques described herein.
Figure 2:
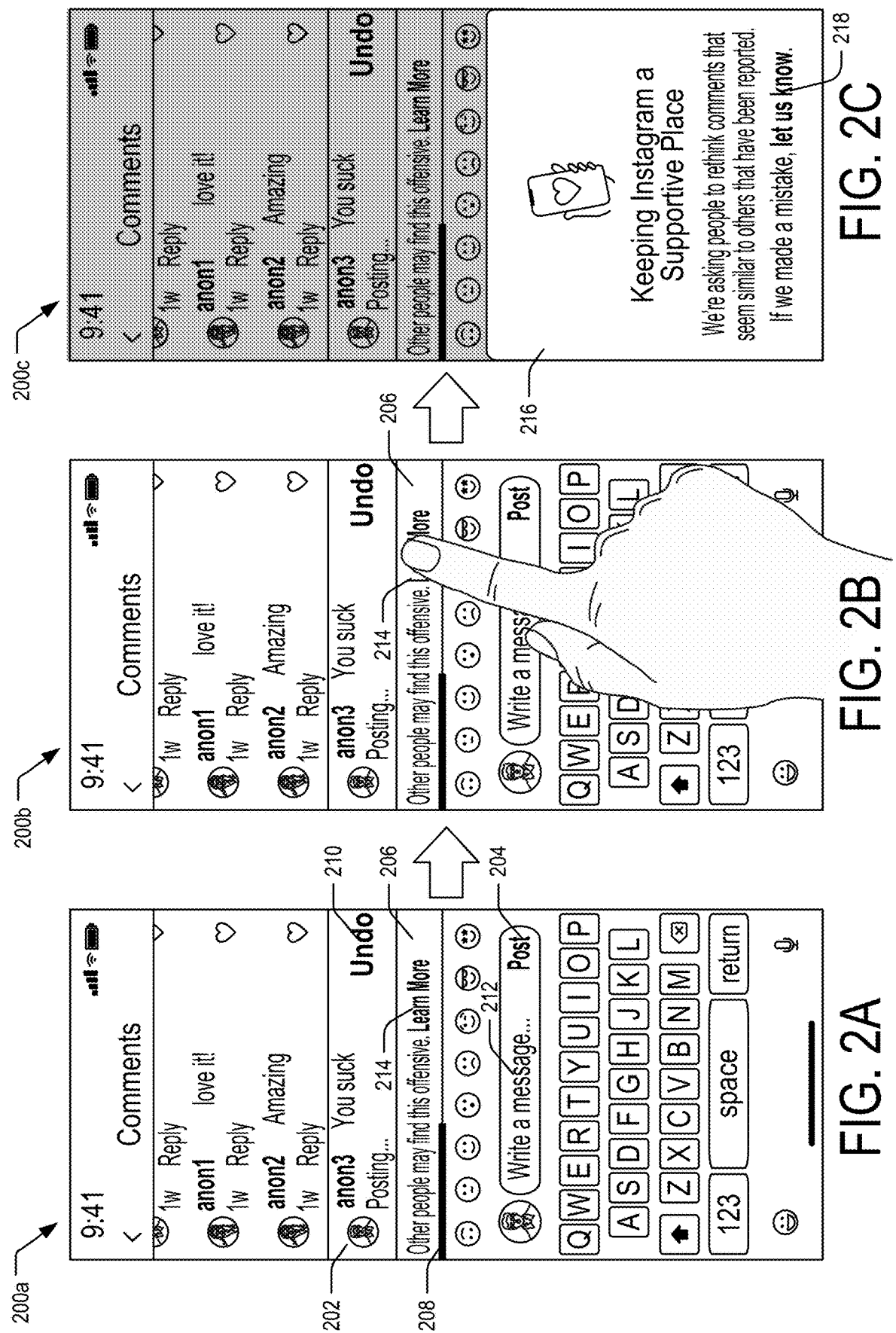
FIGS. 2A-2C illustrate example interfaces usable to present a notification that is selectable to control the display of a potentially offensive comment before the potentially offensive comment is posted.
Figure 3:
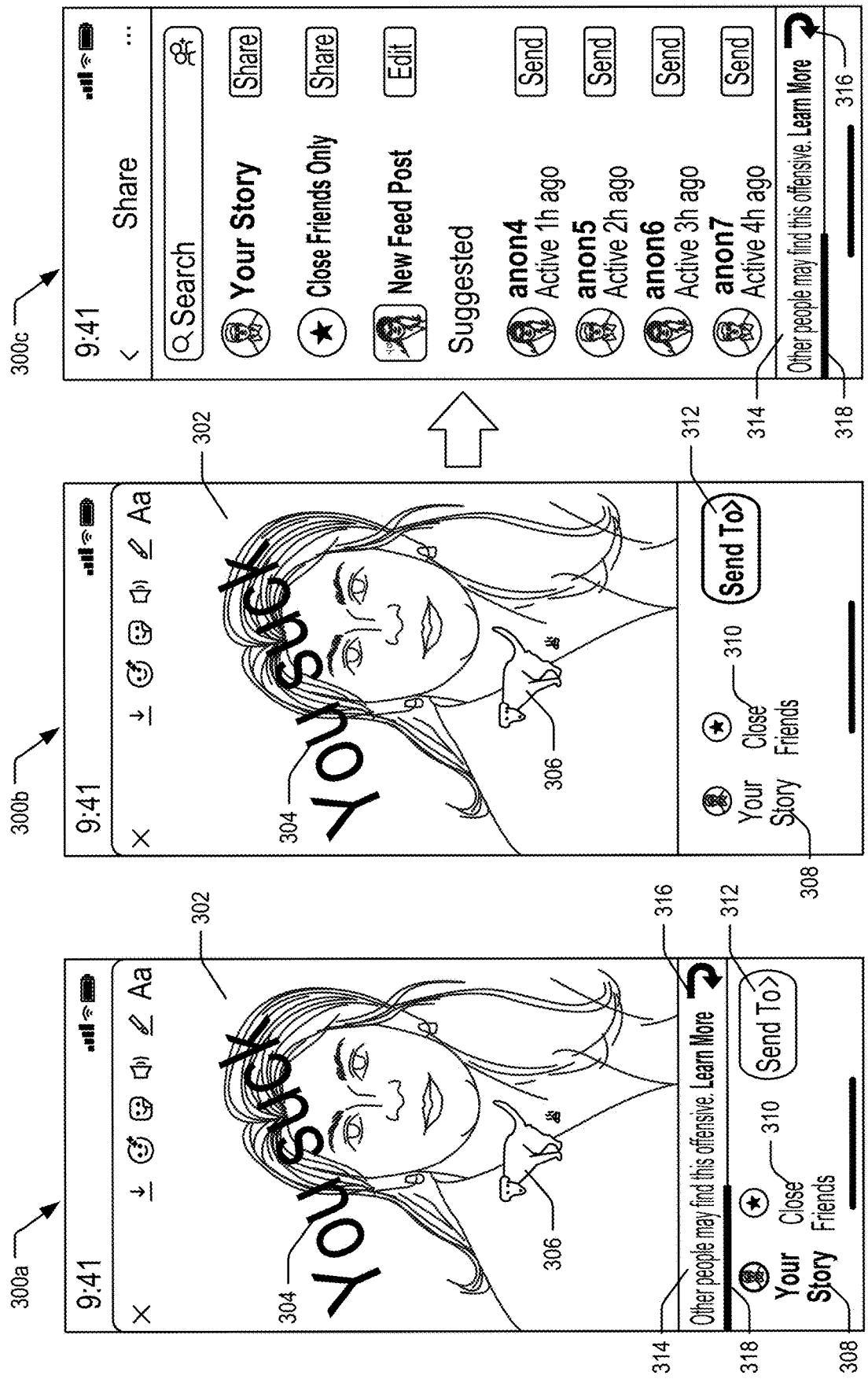
FIGS. 3A-3C illustrate example interfaces usable to present a notification that is selectable to control the display of a potentially offensive story before the potentially offensive story is shared.

As discussed above, controlling whether and how offensive content is shared on digital platforms may present challenges. For instance, offensive content can take a number of forms (e.g., text, image, video, audio, or a combination of these), and the number of ways to share offensive content is ever growing. In some cases, offensive content may be linked with cyberbullying, which may include threats, hate speech, degrading or shaming an individual, sharing of personal information in a way that is meant to blackmail or harass someone, and repeated, unwanted messages, to name a few examples. Offensive content may also include encouragement of violence, threats of harm to public and personal safety (e.g., specific threats of physical harm, threats of theft, vandalism, and other financial harm), glorification of self-injury, other types of graphic content, obscenity, and/or nudity. Offensive content can have negative, serious and lasting consequences for both the person sharing the content and consumers of the content including hurt feelings, reputational damage, and in more extreme cases depression, substance use, and suicide.

Existing options for controlling whether and how offensive content is shared on digital platforms have been inadequate. For instance, previous techniques included self-reporting of offensive content by consumers of the offensive content. In such cases, a consumer of the offensive content may choose to not report the content, thus permitting or even exacerbating harm caused to a victim of the offensive content (e.g., a person unknowingly pictured in the offensive content). In another example, previous techniques also included automatic detection and removal of some offensive content, such as by a computing device and/or an administrator without needing a user to report the offensive content. However, these automated techniques often were not implemented in real-time, and thus offensive content would be shared for at least some period of time before being removed from the digital platform. Additionally, users of existing content sharing systems may not realize that content may be offensive to other users, and/or may not intend for content to offend other users despite a likelihood of the content to do so. In any case, previous techniques did not provide a user who was in the process of sharing content with a notification that the content was potentially offensive, nor the ability to reconsider sharing the potentially offensive content before the share action was completed. This application describes techniques for determining when content to be shared by a user may be offensive, and providing the user with a notification that the content may be offensive. In some examples, the techniques described herein may provide the user with a notification that includes a selectable control allowing the user to reconsider and withdraw or rescind the content from being shared. That is, the selectable control may allow the user to "undo" an instruction to share the content before the content is actually shared (e.g., published, sent, or made visible to one or more other users). In some examples, the notification may also include additional information regarding why the content was determined to be offensive, content sharing guidelines, advice for how to revise the content to be less offensive, and so forth.

For instance, consider a first example where a first user is posting a comment on content shared by a second user's account in a social media platform. The comment may be determined to be offensive, e.g., based on a determination that the comment includes hate speech or bullying of the second user. Before the comment is posted, the first user may be provided with a notification that the comment may be offensive, and be presented with an option to revise the comment to be more respectful. If the first user selects the option, the comment may be returned to an editable field, such as a text editing field, allowing the first user to change the content of the comment and/or delete the comment. By notifying the first user that the comment may be offensive before the comment is shared, and providing the first user with means to revise or delete the offensive comment, the described techniques may reduce instances of bullying, improve relationships between users, and so forth.

In some examples, a user may initiate sharing of an item of content from the user's social media account of a social media network. Sharing content from a social media account may take a variety of forms, such as a profile or feed post, a story, a direct message to one or more other users, a tweet, or a snap, to name a few examples. In general, a profile (or feed) post may include text and/or media content items, such as images, video, and/or audio. The profile post may be published to the social media network for consumption by other users, and may be viewable by other users for as long as the user's social media account is active and/or the post is deleted by the user, although examples are considered in which the profile post is removed and/or deleted after an amount of time (e.g., one hour, one day, one week, etc.). In some cases, a profile post shared by the user may be included in respective content feeds of other users of the social media network that have "followed" the user, are "friends" with the user, are connections of the user, or are otherwise associated with the user.

A story may be similar to a profile post, in that the story may include text and/or media content items, such as images, video, and/or audio, is published to the social media network for consumption by other users, and may be included in a feed (although, in some cases, a separate feed from the profile post feed). However, a story may differ from a profile post in that the story may be shared only with a selected subset of the user's followers, and/or may be removed from being viewed by followers of the user's account after a certain period of time (e.g., one hour, one day, one week, etc.). A direct message may also include text and/or media content items, such as images, video, and/or audio, but in general, a direct message is shared with a single other user of the social media network, or a selected subset of other users of the social media network rather than shared with all of a user's followers.

As noted above, the variety of content sharing opportunities provided by profile posts, stories, direct messages, and other types of communications may allow for sharing of offensive content, which may result in negative consequences. Therefore, the described techniques detect potentially offensive content before, during, and/or after the content is shared in a profile post, story, or direct message, and notify the user sharing the content that the content may be potentially offensive. In some examples, a machine learning algorithm may detect potentially offensive content in the flow of sharing content, such as in an image, a video, and/or text included in the content to be shared. When potentially offensive content is detected in a profile post, a story, and/or a direct message, an instruction may be sent to a computing device associated with the user to display a notification that the content may be offensive, and allow the user to edit the content to make the content more respectful before the content is shared according to the different sharing techniques for the feed post, story, direct message, and/or other communication.

For instance, a notification may be output on a screen of a process flow when sharing a profile post or a story, but before the content is shared with other users. In the case of a direct message, a notification may be output in real time as the user inputs characters into a message, and/or upon completion of a message (e.g., after the user selects "send" but before the content is shared with the recipient(s) of the message). In some examples, the notification may be displayed for an amount of time (e.g., 3 seconds, 5 seconds, 8 seconds, etc.), before the content is shared as intended according to the content sharing technique, giving the user time to review the content and make a decision as to whether the user would like to proceed with sharing the content or would like to revise the content to make the content more respectful. The amount of time that the notification is to be displayed may be represented by a timer, a progress bar, an audio signal, or some other visual indicator corresponding to a remaining amount of time to revise and/or rescind the content from being shared. Additionally, in some examples, the content may be prevented from being shared with other users for the amount of time, allowing the user to withdraw or edit the content before it is made visible to other users.

Various embodiments of the present disclosure include systems, methods, and non-transitory computer-readable media of a social networking system. In some examples, a social networking system may send, to a computing device associated with a first user account, content originating from a second user account. The social networking system may receive, from the computing device associated with the first user account, a comment associated with the content. The social networking system may input the comment into a machine-learned model trained to identify potentially offensive comments. The social networking system may receive, from the machine-learned model, a score associated with an offensiveness of the comment. The social networking system may compare the score to a threshold score corresponding to an offensiveness level, and send, to the computing device associated with the first user account and based at least in part on the score being greater than the threshold score, an instruction to present a notification associated with the comment.

In some examples, the instruction to present the notification includes a duration of time to present the notification.

In some examples, the social networking system may post the comment responsive to the duration of time elapsing.

In some examples, the instruction to present the notification further instructs the computing device associated with the first user account to display a visual indicator to visually indicate the duration of time.

In some examples, the instruction is a first instruction, and the social networking system sends, to the computing device associated with the first user account, a second instruction to display the comment in a pending state for a duration of time.

In some examples, the instruction is a first instruction, and the social networking system sends, to the computing device associated with the first user account, a second instruction to present a control usable to undo the comment.

In some examples, the social networking system receives, from the computing device associated with the first user account, an indication of a selection of the control to undo the comment, and sends, to the computing device associated with the first user account, a third instruction to display the comment in an editable field that enables the user to edit the comment.

In some examples, the offensiveness level is a first offensiveness level, the threshold score is a first threshold score, and the social networking system compares the score to a second threshold score corresponding to a second offensiveness level, and responsive to the score being greater than the second threshold score, preventing the comment from being posted or otherwise made visible to other user accounts.

In some examples, the social networking system may receive, from a computing device associated with a user account, an indication of content to be shared by the user account. The social networking system may input the content into a machine-learned model trained to identify potentially offensive content. The social networking system may receive, from the machine-learned model, a score associated with an offensiveness of the content. The social networking system may compare the score to a threshold score corresponding to an offensiveness level, and send, to the computing device associated with the user account and based at least in part on the score being greater than the threshold score, an instruction to present a notification associated with the content.

In some examples, the content may include a profile post, a story, a direct message, a snap, or a tweet.

In some examples, the instruction is a first instruction, and the social networking system sends, to the computing device associated with the user account, a second instruction to present a control usable to undo sharing the content.

In some examples, the potentially offensive content identifiable by the machine-learned model may include content categories including bullying content, hate speech content, and/or nudity content, the social networking system determines the content category of the potentially offensive content, and the instruction to present the notification is further based at least in part on the content category of the potentially offensive content.

In some examples, the machine-learned model may include an image classifier trained to identify potentially offensive images or video.

In some examples, the machine-learned model may include an audio classifier trained to identify potentially offensive sounds or speech.

In some examples, the machine-learned model may include a text classifier trained to identify potentially offensive text.

In some examples, the machine-learned model may include an optical character recognition (OCR) layer to identify the potentially offensive text depicted in an image or video.

In some examples, the user account is a first user account, the social networking system determines a second user account associated with the content, and the instruction to present the notification is based at least in part on the second user account being associated with the content.

In some examples, the content is a profile post, a story, or a direct message including one or more content types, such as an image, a video, a sound, or text, and the score is based at least in part on combining individual scores associated with the offensiveness of each of the content types included in the profile post, the story, or the direct message.

In some examples, the instruction to present the notification includes a duration of time to present the notification.

In some examples, the social networking system shares the content responsive to the duration of time elapsing.

In some examples, the instruction to present the notification further instructs the computing device associated with the user account to display a visual indicator to visually indicate the duration of time.

In some examples, the instruction is a first instruction, and the social networking system sends, to the computing device associated with the user account, a second instruction to display the content in a pending state for a duration of time.

In some examples, the social networking system compares the score to a first threshold score corresponding to a first offensiveness level and, if the score is greater than or equal to the first threshold, prevents the content from being shared based at least in part on the score being greater than or equal to the first threshold score. If the score is less than the first threshold but greater than a second threshold corresponding to a second offensiveness level, the social networking system may output a notification including a control usable to undo sharing the content based at least in part on the score being less than the first threshold score and greater than the second threshold score.

In some examples, the computing device is a first computing device, the user account is a first user account, the machine-learned model is a first machine-learned model, and the score is a first score, and the social networking system permits the content to be shared with a second computing device associated with a second user account, then inputs the content into a second machine-learned model trained to identify the potentially offensive content, receives from the second machine-learned model, a second score associated with the offensiveness of the content, and withdraws the content from being shared with the second computing device associated with the second user account based at least in part on the second score or sends a notification to the user giving the user an option to withdraw the content.

In addition to the societal improvements discussed above, the techniques described herein also improve performance of one or more computing devices by reducing an amount of content sent over a network. For instance, if a user withdraws content from being shared in response to a notification that the content may be offensive, the content may be deleted from the user's computing device and may be prevented from being disseminated to other user's computing devices. In this way, the quantity of data sent over the network may be reduced. The quantity of data sent over the network may further be reduced with potentially offended users reducing complaints, reducing tagging of offensive content, and/or reducing the number of blocked users. Additionally, in some examples, the described techniques improve a user interface of a computing device by displaying a limited set of information to the user. For instance, the information displayed to a user sharing content may improve efficiency of using a computing device by allowing the user to more quickly access options to control how data input by the user is displayed to other users. Further, the speed of presenting controls for outputting content is improved by selectively outputting controls to the user that correspond to the content itself, e.g., by outputting a different control for a bullying comment on another user's post than a control output on a story that includes hate speech. In this way, the user may decide in real time whether to share or withdraw content much faster (e.g., by selecting a control on a notification presented at the time of sharing the content) than existing techniques, which may require the user to withdraw content after the content has been shared by navigating a series of settings and/or menu screens to remove the content.

These and other aspects are described further below with reference to the accompanying drawings. The drawings are merely example implementations, and should not be construed to limit the scope of the claims. For example, while examples are illustrated in the context of a user interface for a mobile device, the techniques may be implemented using any computing device and the user interface may be adapted to the size, shape, and configuration of the particular computing device. Also, while many of the examples are given in the context of offensive content, the techniques described herein may also be applied to, without limitation, aggressive content, threatening content, sexual content, abusive content, obscene content, or any other content that is objectionable to a user, with machine-learned models being trained to detect any or all of these types of content.

Example System Architecture

FIG. 1 is a schematic view of an example computing system 100 usable to implement example techniques described herein to notify a user in response to the user attempting to share potentially offensive content with other users via the system 100. In some examples, the system 100 may include users 102(1), 102(2), . . . 102(n) (collectively "users 102") to interact using computing devices 104(1), 104(2), . . . 104(m) (collectively "computing devices 104") with a social networking system 106 via a network 108. In this example, n and m are non-zero integers greater than 1.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the social networking system 106 and/or communicate with one another.

The social networking system 106 may include one or more servers or other computing devices, any or all of which may include one or more processors and memory storing computer executable instructions to implement the functionality discussed herein attributable to the social networking system or digital platform. The social networking system 106 may enable its users 102 (such as persons or organizations) to interact with the social networking system 106 and with each other via the computing devices 104. The social networking system 106 may, with input from a user, create and store in the social networking system 106 a user account associated with the user. The user account may include demographic information, communication-channel information, and information on personal interests of the user. The social networking system 106 may also, with input from a user, create and store a record of relationships of the user with other users of the social networking system, as well as provide services (e.g., posts, comments, photo-sharing, messaging, tagging, mentioning of other users or entities, games, etc.) to facilitate social interaction between or among the users 102.

The social networking system 106 may be configured to help foster the safety and security of the users 102. For instance, the social networking system 106 may provide the users 102 with notifications when the social networking system 106 detects that one of the users 102 intends to share potentially offensive content via the social networking system 106.

For example, at operation 110 (indicated by "1"), the first user 102(1) disseminates offensive content (e.g., a comment, a message, a post, a story, etc.) to the second user 102(2) and/or one or more other users 102(n). For example, the offensive content may be a bullying message sent from the first user 102(1) to the second user 102(2). In some examples, the offensive content may be a profile post or a story by the first user 102(1) that includes nudity or hate speech, where the profile post or the story is shared to followers of the first user 102(1) that include the users 102(2)-102(n).

In some examples, the second user 102(2) may post an item of content (e.g., a profile post, a story, etc.) on which the first user 102(1) may comment. The item of content posted by the second user 102(2) may be shared with the first user 102(1), and in some cases, also shared with one or more other users 102(n). Returning to the operation 110, in some examples, the first user 102(1) may post an offensive comment regarding an image or other content item included in the post by the second user 102(2), or directed at the second user 102(2). In some cases, the comment may be visible to the second user 102(2) and one or more other users 102(n) who follow the second user 102(2).

In some examples, the social networking system 106 may receive an indication that the computing device 104(1) intends to share the potentially offensive content according to the operation 110. Prior to sharing the offensive content with the other users 102(2)-102(n), an operation 112 (indicated by "2") includes detecting offensive content. For instance, the social networking system 106 may input the potentially offensive content into a machine-learned model 114 trained to detect offensive content. In some examples, the machine-learned model 114 may build a mathematical model using training data that includes offensive content such as bullying content, hate speech, nudity, taunting, and so forth to make predictions on future content on whether the content is offensive or not without being explicitly programmed to perform the detection. Further, the machine-learned model 114 may be trained to output a score corresponding to an offensiveness level of the content (e.g., a likelihood that the content is offensive, a degree of offensiveness, etc.), and/or multiple scores for different types of offensive content (e.g., bullying content, hate speech, nudity, taunting, and so forth). The machine-learned model may take a variety of forms.

For example, in the case of a comment to be posted by the first user 102(1) in association with a profile post or a story previously shared by the second user 102(2) (e.g., according to the operation 112), the machine-learned model 114 may be a text classifier trained to identify potentially offensive text. The text classifier, in some examples, may be an artificial neural network trained to detect bullying, hate speech, taunting, threats, blackmail, harassment, promotion of self-harm, and so forth. The machine-learned model 114 may receive the comment to be posted by the first user 102(1), and output a score associated with the comment indicative of an offensiveness level (e.g., a likelihood that the content is offensive) of the comment. In some examples, the machine-learned model 114 may output multiple scores corresponding to different types of offensive content, such as a score for bullying, a score for hate speech, a score for taunting, and so on.

In some examples, content such as a profile post, a story, or a direct message received from the user 102(1) may be input into the machine-learned model 114 before the content is shared with one or more of the other users 102(2)-102(n). In some examples, content included in a profile post, a story, or a direct message may include a variety of content types, such as text, image, video, audio, emojis, GIFs, stickers, and/or other types of overlays. These content types may individually correspond to offensive content, and/or may correspond to offensive content when consumed in combination with other content types included in a profile post, a story, or a direct message.

Accordingly, the machine-learned model 114 may include a number of classifiers to analyze the different content types included in a profile post, a story, or a direct message individually and/or in combination. For instance, the machine-learned model 114 may include an artificial neural network including a computer vision classifier trained to analyze images and/or video (e.g., a frame and/or frames of a video) for nudity, offensive gestures, violence, graphic content, and so forth. In addition or alternatively, the machine-learned model 114 may include an artificial neural network including a speech recognition classifier trained to analyze speech or other audio included in a video or audio recording for bullying, hate speech, taunting, threats, blackmail, harassment, promotion of self-harm, and so forth. Further, the machine-learned model 114 may include an optical character recognition (OCR) classifier, which when given an image representing printed text (e.g., in a GIF, sticker, characters traced onto a touch screen using a finger or stylus, etc.), determines the corresponding text. The OCR classifier may output the text to a text classifier trained to identify potentially offensive text, as described above.

Although specific machine-learned models are described above, other types of machine-learned models can additionally or alternatively be used. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In some examples, the machine-learned model 114 may determine an overall offensiveness score by combining individual offensiveness scores of components of the content to be shared by the first user 102(1) having different content types. For instance, consider an example in which the first user 102(1) selects an option to share a story with the other users 102(2)-102(n) that includes a video, a GIF, and two text overlays. The machine-learned model 114 may output an individual offensiveness score for the video, an individual offensiveness score for the GIF, an individual offensiveness score for the first text overlay, and an individual offensiveness score for the second text overlay. The machine-learned model 114 may in some examples combine these four scores for the content components (e.g., by a summation, a weighted average, etc.) to determine an overall offensiveness score for the story. In other examples, the machine-learned model 114 may analyze the content input by the user 102(1) as a whole (e.g., either in addition to or alternatively to analyzing individual components of the content) to determine an overall offensiveness score for the content.

After the machine-learned model 114 outputs the offensiveness score for the content, in some examples, the social networking system 106 compares the offensiveness score to one or more threshold scores corresponding to an offensiveness level. For instance, an offensiveness level may correspond to a certainty that the content would be offensive to users of the social networking system 106. Using an example scale of 0 to 100, where 0 corresponds to not at all likely to be offensive and 100 corresponds to complete certainty that the content is offensive, an image of an apple may receive a score of 5 and an image of a person being punched may receive a score of 85. Of course, any scale may be used to indicate an offensiveness level of content (e.g., a scale from 0 to 1, a scale from 0 to 10, etc.). Additionally, the machine-learned model 114 may continuously adapt the scale to accommodate different trends in content that may become more or less offensive over time, e.g., based on news items described in content over the social networking system 106, based on hashtags used in the social networking system 106, based on people and/or places tagged using the social networking system 106, and so forth.

In some cases, an offensiveness score output by the machine-learned model 114 may be compared to a first threshold score for an offensiveness level that may designate whether the content should be withheld from posting altogether (e.g., blocked). Continuing with the example scale from 0 to 100 above, the first threshold score may be set to 95 (or 98, 99, or some other score) on the scale. In this example, if content to be shared by the first user 102(1) exceeds the first threshold score of 95, the content may be withheld from being shared as intended by the first user 102(1). On the other hand, if the content to be shared by the first user 102(1) is less than the first threshold score, the content may be shared as intended and/or may be compared to one or more additional threshold offensiveness level scores.

For example, the offensiveness score output by the machine-learned model 114 may be compared to a second threshold score for an offensiveness level that may designate whether a notification is displayed by the computing device 104(1) to the first user 102(1) associated with the content. If the social networking system 106 determines that a notification is to be displayed, an operation 116 (indicated by "3") includes sending an instruction to output a notification based on the offensiveness level (e.g., likelihood that the content is offensive). The notification may provide an indication to the first user 102(1) that the content that the first user 102(1) intends to share with one or more of the other users 102(2)-102(n) may potentially be offensive to the other user(s). In some cases, the notification may give the first user 102(1) selectable options on how to proceed based on the content being potentially offensive, such as an option to withdraw or undo sharing of the content, an option to edit the content, an option to continue with sharing the content, and so forth. In some examples, the notification may be displayed for a predetermined amount of time (e.g., 2 seconds, 3 seconds, 5 seconds, 8 seconds, 10 seconds, etc.) before the content is shared. For instance, when a user enters and submits content, if the social networking system 106 determines that the content meets or exceeds a threshold likelihood of being found to be offensive (e.g., the second threshold level described above), the social networking system 106 may hold the content in a pending state without sharing the content with other users until the predetermined amount of time elapses. Furthermore, in some examples, the amount of time that the notification is displayed by the computing device 104(1) may vary based on the offensiveness score, such as by displaying the notification for more time before sharing the content when the offensiveness score is higher, and/or displaying the notification for less time before sharing the content when the offensiveness score is lower.

At operation 118 (indicated by "4"), a response to the notification is received by the social networking system 106 from the computing device 104(1). The response may include an indication that the timer has expired, an indication that the content is being withdrawn from being shared by the user account, and/or an indication that the content has been edited, to name a few examples. In some examples, the content shared by the first user 102(1) is pending and not visible to other users until a timer indicating the predetermined amount of time expires, or approval to post the content by the first user 102(1) is received. The timer may be displayed in association with the notification that the content that the user 102(1) intends to share is potentially offensive. In this way, the timer gives the user 102(1) an indication that the content is not yet shared (e.g., is in a pending state), while also giving the user an opportunity to revise the content to make the content more respectful, and/or to withdraw or undo the content before the content is shared with the other users 102(2)-102(n). By preventing the content from being shared while the notification is displayed, notifying the user 102(1) that the content is potentially offensive, and providing the user 102(1) with an opportunity to revise or withdraw the content, the users 102 may be spared from the negative consequences of disseminating offensive content and provide the users 102 with a more positive user experience with the social networking system 106.

At operation 120 (indicated by "5"), the social networking system 106 controls whether the offensive content is shared with one or more other users. In some examples, if the offensiveness score indicates that the content is very likely to be offensive, the social networking system 106 may prevent the content from being shared with the other users 102(2)-102(n) at all. If the social networking system 106 receives an indication that the timer presented as part of the notification output by the computing device 104(1) has expired without an input from the user 102(1), the social networking system 106 may share the content with the other users 102(2)-102(n) as input by the user 102(1). In some examples, the response to the notification may include revisions to the content, and the social networking system 106 may proceed to share the content with the other users 102(2)-102(n) based on receiving the revised content, and/or may share the content with the other users 102(2)-102(n) responsive to determining (e.g., by the machine-learned model 114) that an offensiveness score for the revised content does not meet the threshold offensiveness levels. In some cases, the social networking system 106 may receive a response indicating that the user 102(1) has withdrawn the content in response to receiving the notification, and thus the social networking system may prevent the content from being shared with the other users 102(2)-102(n) (e.g., by deleting the content from storage of the social networking system 106 before the content is shared).

In some examples, the social networking system 106 may provide privacy features to the users 102 while interacting with the social networking system 106. In particular examples, one or more objects (e.g., content or other types of objects) of the computing system 100 may be associated with one or more privacy settings. The one or more objects may be stored on or otherwise associated with any suitable computing system or application, such as, for example, the social-networking system 106, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user 102(1) may share an object to the social networking system 106. The object may be associated with a concept node connected to a user node of the user 102(1) by an edge. The user 102(1) may specify privacy settings that apply to a particular edge connecting to the concept node of the object, or may specify privacy settings that apply to all edges connecting to the concept node. In some examples, the user 102(1) may share a set of objects of a particular object-type (e.g., a set of images). The user 102(1) may specify privacy settings with respect to all objects associated with the user 102(1) of that particular object-type as having a particular privacy setting (e.g., specifying that all images posted by the user 102(1) are visible only to friends of the user and/or users tagged in the images).

In particular examples, the social networking system 106 may present a "privacy wizard" (e.g., within a webpage, a module, one or more dialog boxes, or any other suitable interface) to the user 102(1) to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102(1) that may display, to the user 102(1), current privacy settings of the user 102(1). The dashboard functionality may be displayed to the user 102(1) at any appropriate time (e.g., following an input from the user 102(1) summoning the dashboard functionality, following the occurrence of a particular event or trigger action). The dashboard functionality may allow the user 102(1) to modify one or more of the user's current privacy settings at any time, in any suitable manner (e.g., redirecting the user 102(1) to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102(1) (or other entity) for a particular object stored in a data store, the social networking system 106 may send a request to the data store for the object. The request may identify the user 102(1) associated with the request and the object may be sent only to the user 102(1) (or a client system of the user) if the authorization server determines that the user 102(1) is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing system. As an example and not by way of limitation, the user 102(1) may view one or more other users 102(2) . . . 102(n) of an online social network through a "People You May Know" function of the online social network, or by viewing a list of friends of the user 102(1). As an example and not by way of limitation, the user 102(1) may specify that they do not wish to see objects associated with a particular other user (e.g., the user 102(2)) in their newsfeed or friends list. If the privacy settings for the object do not allow it to be surfaced to, discovered by, or visible to the user 102(1), the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102(1) may specify that the user's status updates are public, but any images shared by the user are visible only to the user's friends on the online social network. In some examples, the user 102(1) may specify different privacy settings for different types of entities, such as individual users, friends-of-friends, followers, user groups, or corporate entities. In some examples, the user 102(1) may specify a group of users that may view videos posted by the user 102(1), while keeping the videos from being visible to the user's employer. In particular examples, different privacy settings may be provided for different user groups or user demographics. As an example and not by way of limitation, the user 102(1) may specify that other users who attend the same university as the user 102(1) may view the user's pictures, but that other users who are family members of the user 102(1) may not view those same pictures.

In particular examples, the social networking system 106 may provide one or more default privacy settings for each object of a particular object-type. A privacy setting for an object that is set to a default may be changed by a user associated with that object. As an example and not by way of limitation, all images posted by the user 102(1) may have a default privacy setting of being visible only to friends of the first user and, for a particular image, the user 102(1) may change the privacy setting for the image to be visible to friends and friends-of-friends.

In particular examples, privacy settings may allow the user 102(1) to specify (e.g., by opting out, by not opting in) whether the social networking system 106 may receive, collect, log, or store particular objects or information associated with the user 102(1) for any purpose. In particular examples, privacy settings may allow the user 102(1) to specify whether particular applications or processes may access, store, or use particular objects or information associated with the user. The privacy settings may allow the user 102(1) to opt in or opt out of having objects or information accessed, stored, or used by specific applications or processes. The social networking system 106 may access such information in order to provide a particular function or service to the user 102(1), without the social networking system 106 having access to that information for any other purposes. Before accessing, storing, or using such objects or information, the social networking system 106 may prompt the user 102(1) to provide privacy settings specifying which applications or processes, if any, may access, store, or use the object or information prior to allowing any such action. As an example and not by way of limitation, the user 102(1) may transmit a message to the user 102(2) via an application related to the online social network (e.g., a messaging app), and may specify privacy settings that such messages should not be stored by the social networking system 106.

In particular examples, the user 102(1) may specify whether particular types of objects or information associated with the user 102(1) may be accessed, stored, or used by the social networking system 106. As an example and not by way of limitation, the user 102(1) may specify that images sent by the user 102(1) through the social networking system 106 may not be stored by the social networking system 106. In some examples, the user 102(1) may specify that messages sent from the user 102(1) to another user 102(2) may not be stored by the social networking system 106. In some cases, the user 102(1) may specify that all objects sent via a particular application may be saved by the social networking system 106.

In particular examples, privacy settings may allow the user 102(1) to specify whether particular objects or information associated with the user 102(1) may be accessed from particular client systems or third-party systems. The privacy settings may allow the user 102(1) to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102(1) may be prompted to specify a particular privacy setting for each context. As an example and not by way of limitation, the user 102(1) may utilize a location-services feature of the social networking system 106 to provide recommendations for restaurants or other places in proximity to the user 102(1). The default privacy settings of the user 102(1) may specify that the social networking system 106 may use location information provided from the computing device 104(1) of the user 102(1) to provide the location-based services, but that the social networking system 106 may not store the location information of the user 102(1) or provide it to any third-party system. The user 102(1) may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example and not by way of limitation, the user 102(1) may transmit a message to the user 102(2), and the social networking system 106 may temporarily store the message in a data store until the user 102(2) has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example and not by way of limitation, the user 102(1) may share a first image and specify that the first image is to be public to all other users. At a later time, the user 102(1) may specify that any images shared by the user 102(1) should be made visible only to a first user group. The social networking system 106 may determine that this privacy setting also applies to the first image and make the first image visible only to the first user group. In particular examples, the change in privacy settings may take effect only going forward. Continuing the example above, if the user 102(1) changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the social networking system 106 may determine that user 102(1) may want to change one or more privacy settings in response to a trigger action associated with the user 102(1). The trigger action may be any suitable action on the online social network. As an example and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102(1) to change the privacy settings regarding the visibility of objects associated with the user 102(1). The prompt may redirect the user 102(1) to a workflow process for editing privacy settings with respect to one or more entities associated with the trigger action. The privacy settings associated with the user 102(1) may be changed only in response to an explicit input from the user 102(1), and may not be changed without the approval of the user 102(1). As an example and not by way of limitation, the workflow process may include providing the user 102(1) with the current privacy settings with respect to the user 102(2) or to a group of users (e.g., un-tagging the user 102(1) or the user 102(2) from particular objects, changing the visibility of particular objects with respect to the user 102(2) or a group of users), and receiving an indication from the user 102(1) to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the social networking system 106 may send a reminder to the user to confirm his or her privacy settings every six months or after every ten photo posts. In particular examples, privacy settings may also allow users to control access to the objects or information on a per-request basis. As an example and not by way of limitation, the social networking system 106 may notify the user whenever a third-party system attempts to access information associated with the user, and require the user to provide verification that access should be allowed before proceeding.

Example User Interfaces

FIG. 2A-FIG. 5 are schematic views showing example user interfaces that are usable to implement the techniques described herein for notifying a user that content the user intends to share may potentially be offensive. The interfaces and/or the notifications may be generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system. As discussed above, the interfaces described in this section may, but need not, be implemented in the context of the system 100.

FIGS. 2A-2C illustrate an example in which offensive content in the form of a comment has been instructed to be shared by a first user ("anon3" in this example) in response to a post of a photo shared in a feed of a second user. A first user interface 200a shown in FIG. 2A corresponds to comments in the second user's feed or story as it would appear on a computing device associated with an account of the second user. In this example, the first user (anon3) has input an offensive comment 202 ("You suck") in response to the second user's post and selected a "Post" indicator 204 in the user interface to share the comment. The comment 202 is associated with the second user in that it is in response to a post made by the second user. As used herein, unless otherwise indicated, the term "select" or "selection" means a touch, a force touch, a multi-touch, a swipe in any direction, a voice input, a mouse input, a stylus input, or any other input designed to interact with a user interface control.

In conventional comment posting techniques, the comment 202 would be shared with not only the second user upon selection of the Post indicator 204 in the user interface 200a by the first user, but would also be shared with any of the second user's followers on the social media platform (e.g., the other users who have commented, "anon 1," and "anon2") who may subsequently view the post by the second user. Therefore, sharing of an offensive comment in a conventional social media platform may cause emotional harm when the second user views the comment, along with embarrassment when the second user's followers view the comment as well.

The techniques described herein, however, detect the potentially offensive comment 202 prior to the comment 202 being shared, and provide the first user with the ability to revise and/or withdraw the comment from being shared. For instance, when the first user selects the Post indicator 204, the comment 202 may be input into a machine-learned model trained to detect offensive content, such as described in relation to FIG. 1. The machine-learned model may output an offensiveness score of the comment 202, and the score may be compared to a threshold corresponding to an offensiveness level of the comment 202. If the score is greater than (or less than, in some examples) the threshold score, the social networking system 106 of FIG. 1 may output an instruction to the computing device of the first user to display a notification 206 associated with the comment 202, and prior to the comment 202 being shared with the second user and the followers of the second user.

In some examples, the notification 206 may include text such as "Other people may find this offensive," warning the first user how others (including the second user) may perceive the comment that the first user is intending to share.

Additionally, in examples, the instruction to present the notification 206 may include a duration of time to present the notification 206 (e.g., 3 seconds, 5 seconds, 8 seconds, etc.) by the computing device of the first user. To make the first user aware of the duration of time that the notification 206 will be displayed, a visual indicator such as a progress bar 208 may also be displayed (e.g., proximate the notification 206), visually indicating the elapsed and/or remaining duration of time that the notification 206 is displayed. Other visual indicators of elapsed and/or remaining time that the notification 206 is displayed are also considered, such as a digital or analog timer, a progress wheel, an hourglass, "greying out" the other comments or a portion of the user interface (e.g., similar to the progression of the progress bar across the screen) and so forth. Additionally, in some examples, the social networking system may prevent posting of the comment 202 for the duration of time that the notification 206 is displayed, such as by sending an instruction to the computing device of the first user, and/or preventing the content of the comment from being associated with the second user's post in the social networking application.

Although not explicitly illustrated in FIGS. 2A-2C, in some cases, the comment 202 may be posted responsive to the duration of time elapsing, thus sharing the comment with the second user and/or the followers of the second user. By sharing the comment 202 after a duration of time has elapsed, the techniques described herein give the first user an opportunity to reconsider sharing the potentially offensive content, but may allow the comment 202 to be shared without the first user having to execute an additional action in the process of sharing the comment (e.g., by affirmatively selecting an additional control to post the comment). However, examples are considered in which an affirmative control may be required to be selected by the first user to continue with posting a potentially offensive comment.

Further, the social networking system may send an instruction to the computing device of the first user to present a control 210 that is usable to undo the comment 202. In some cases, the control 210 may be included as part of the notification 206 and/or displayed proximate the notification 206. In one example, the control 210, when selected, may withdraw the comment 202 from being shared by deleting the content of the comment 202. In some examples, selection of the control 210 may cause the content of the comment 202 to be returned to an editable field 212 (e.g., a text editing field, a photo editing field, etc.), where the first user may revise and/or delete the content included in the comment 202. In this way, the first user is provided with an opportunity to make the comment more respectful after being notified that other users may find the comment 202 to be offensive.

In some examples, the notification 206 may also include a control 214 (in this case, denoted by "Learn More") that is usable to provide the first user with additional information about the notification 206. In this example, a second user interface 200b of FIG. 2b depicts the first user selecting the control 214 of the notification 206 by way of a touch input. As a result of the first user selecting the control 214 of the notification 206, a third user interface 200c of FIG. 2C may be displayed on the computing device of the first user. In the example third user interface 200c, a message 216 may be displayed as a result of the selection of the control 214, which reads "We're asking people to rethink comments that seem similar to others that have been reported. If we made a mistake, let us know." Other messages may be displayed to provide the first user with additional information about why the notification 206 was presented to the first user, such as an indication of the offensiveness score that the comment 202 received from the machine-learned model, examples of other comments that have been reported as offensive, a prompt of a more respectful comment that may replace the comment 202 (e.g., selectable by the user to automatically replace the comment 202), and so forth. In some cases, the message 216 may include a control 218 that is selectable by the first user (in this case, the "let us know" portion of the message 216), that, when selected by the first user, may provide feedback to the social networking system that the first user does not interpret the comment 202 to be offensive. Such feedback may be used to refine the parameters of the machine-learned model to make more accurate predictions on offensive content in the future.

FIGS. 3A-3C illustrate example interfaces usable to present a notification that is selectable to control the display of a potentially offensive story before the potentially offensive story is shared by a first user. A first user interface 300a shown in FIG. 3A corresponds to a story composed by the first user, which includes an image 302, a text overlay 304, and a sticker 306. Other content may be included in a story, as described above in relation to FIG. 1. The image 302 included in the story may be of a second user, whom the first user may intend to share an offensive story about with followers of the first user. In some examples, the second user may be a follower of the first user on the social networking application, although examples are contemplated in which the second user is not a follower of the first user. In cases where the second user is not a follower of the first user, the second user may not have an opportunity to see the story before other followers of the first user view the story, and thus may not have an opportunity to request to have the story withdrawn (e.g., by directly requesting the first user and/or sending a request to the social networking system to remove the story) before other users see the story.

The first user interface 300a may include selectable controls for sharing the story with different groups of followers of the first user, such as a "Your Story" control 308, a "Close Friends" control 310, and/or a "Send To" control 312. In examples, the Your Story control 308 may be a single-input control for sharing the story with all of the first user's followers, the Close Friend control 310 may be a single-input control for sharing the story with a pre-selected group of the first user's followers, and the Send To control 312 may cause an additional user interface to be presented upon selection that the first user may select followers to share the story with. In the first user interface 300a, the Your Story control 308 has been selected by the first user, as indicated by the bolded icon. A second user interface 300b shown in FIG. 3B corresponds to the story depicted in the first user interface 300a of FIG. 3A, but in the second user interface 300b, the Send To control 312 has been selected by the first user, as indicated by the bolded icon. As a result of the first user selecting the Send To control 312, a third user interface 300c of FIG. 3C may be displayed by the computing device of the first user, in which the first user may select from the first user's followers who the story will be shared with.

In examples, the social networking system may detect the potentially offensive story prior to the story being shared, and provide the first user with the ability to revise and/or withdraw the story from being shared. For instance, when the first user selects the Your Story control 308, the story may be input into a machine-learned model trained to detect offensive content, such as described in relation to FIG. 1. Similarly, when the first user selects the Send To control 312, followed by one or more of the first user's followers listed in the third user interface 300c, the story may be input into a machine-learned model trained to detect offensive content, such as described in relation to FIG. 1. The machine-learned model may output an offensiveness score of the story, and the score may be compared to a threshold corresponding to an offensiveness level of the story. If the score is greater than (or less than) the threshold score, the social networking system 106 of FIG. 1 may output an instruction to the computing device of the first user to display a notification 314 associated with the story in the first user interface 300a and/or the third user interface 300c, prior to the story being shared with the followers of the first user in accordance with the different sharing techniques of the respective user interfaces. Because a story, unlike a comment, may not inherently be associated with another user's account, the machine-learned model may determine whether the story includes an indication of a second user account associated with the story (e.g., by the first user "tagging" a second user in the story, for example). Determining whether the story includes an indication of a second user account may be considered when determining whether the story includes bullying content, for instance, such as by increasing the offensiveness score of the story if another user is tagged.

The machine-learned model may take a variety of forms, as discussed in relation to the machine-learned model 114 of FIG. 1. For instance, the machine-learned model may be an image classifier trained to identify potentially offensive images or video in the story, an audio classifier trained to identify potentially offensive sounds or speech in the story, and/or a text classifier trained to identify potentially offensive text (including text detected using OCR) in the story, to name a few examples. In cases where the story includes different types of content (e.g., an image, a sound, a text overlay, a tag, a GIF, and so forth), the offensiveness score may be based on combining individual scores associated with an offensiveness of each of the content types included in the story (e.g., by summation, weighted average, etc.).

In some cases, the potentially offensive content identifiable by the machine-learned model may include different content categories, such as bullying content, hate speech content, nudity content, or others. The machine-learned model may be able to determine that the content included in the story (e.g., one or more of the image 302, the text overlay 304, or the sticker 306) is a content category of the known offensive content categories. Based on determining that the story is a content category of the known offensive content categories, the social networking system may customize the notification 314 accordingly. For instance, if the story is determined to include bullying content directed at another particular user of the social networking application (e.g., "anon2"), the notification 314 may be customized to read, "It's not okay to treat other users in this manner Would you like to change your story about anon2?" or the like. On the other hand, if the story is determined to include nudity content, the notification 314 may be customized to read, "Your image may contain content that does not meet our community guidelines. Would you like to choose a different image to share?" Other customized notification examples are also considered.

Similar to the discussion above in relation to FIGS. 2A-2C, in some examples the notification 314 may include text such as "Other people may find this offensive," warning the first user how other users may perceive the story that the first user is intending to share. Additionally, in examples, the instruction to present the notification 314 may include a duration of time to present the notification 314 (e.g., 3 seconds, 5 seconds, 8 seconds, etc.) by the computing device of the first user in either the first user interface 300a or the third user interface 300b. To make the first user aware of the duration of time that the notification 314 will be displayed, a progress bar 316 or other visual timer indication may also be displayed (e.g., proximate the notification 314), visually indicating the elapsed and/or remaining duration of time that the notification 314 is displayed. Additionally, in some examples, the social networking system may prevent sharing of the story for the duration of time that the notification 314 is displayed, such as by sending an instruction to the computing device of the first user to prevent the story from being shared.

Although not explicitly illustrated in FIGS. 3A-3C, in some cases, the story may be shared with the first user's followers responsive to the duration of time elapsing, according to the selection of the Your Story control 308, the Close Friends control 310, and/or the Send To control 312 followed by selected users to share the story with. By sharing the story after a duration of time has elapsed, the techniques described herein give the first user an opportunity to reconsider sharing the potentially offensive content, but may allow the story to be shared without the first user having to execute an additional action in the process of sharing the story (e.g., by affirmatively selecting an additional control to share the story). However, examples are considered in which an affirmative control may be required to be selected by the first user to continue with posting a potentially offensive story.

Further, the social networking system may send an instruction to the computing device of the first user to present a control 316 that is usable to undo sharing the story before the story is shared with other users. In some cases, the control 316 may be included as part of the notification 314 and/or displayed proximate the notification 316. In one example, the control 316, when selected, may withdraw the story from being shared by deleting the content of the story. In some examples, selection of the control 316 may cause the story to be returned to an editable state, where the first user may revise and/or delete the content included in the story. In this way, the first user is provided with an opportunity to make the story more respectful after being notified that other users may find the story to be offensive. In some examples, the notification 314 may also include a control 318 (in this case, denoted by "Learn More") that is usable to provide the first user with additional information about the notification 314. The control 318 may include functionality similar to the control 214 of FIG. 2.

In some cases, multiple thresholds may be used to determine whether and how to share the story. For instance, the threshold score used for determining whether to display the notification 314 may be a first threshold score that the offensiveness score for the story is compared to. In addition, the offensiveness score for the story may be compared to a second threshold score that may prevent the content from being shared, without first notifying the user. In some examples, the second threshold score may be a higher threshold score than the first threshold score (or a lower threshold score), corresponding to more offensive content. In other words, content deemed to be more offensive may be prevented from being shared entirely, while content that may allow for discretion of offensiveness may prompt the notification 314 to be displayed to the first user to allow the first user to decide whether to continue with sharing the content.

In some examples, multiple machine-learned models may be used (e.g., in series) to determine whether and how to share the story. For instance, a first machine-learned model may be included locally in an application on the computing device of the first user that performs an initial assessment of an offensiveness level of the story. The first machine-learned model may utilize limited processing resources to determine potentially offensive content, but may have the advantage of providing the notification 314 sooner than a remotely located, more robust machine-learned model. After the assessment by the first machine-learned model, the story may be shared by the first user with followers of the first user. However, in addition after the assessment by the first machine-learned model, a second, more robust machine-learned model may also analyze the story for offensive content (e.g., a machine-learned model located remotely from the computing device of the first server, at the social networking system). If the second machine-learned model detects that an offensiveness score of the story exceeds a threshold offensiveness level, the social networking system may withdraw the story from being shared, provide an instruction to the computing device of the first user notifying the first user that the content is offensive, provide the first user with controls to edit and/or remove the story, and so forth according to the techniques described herein.

Figure 4:
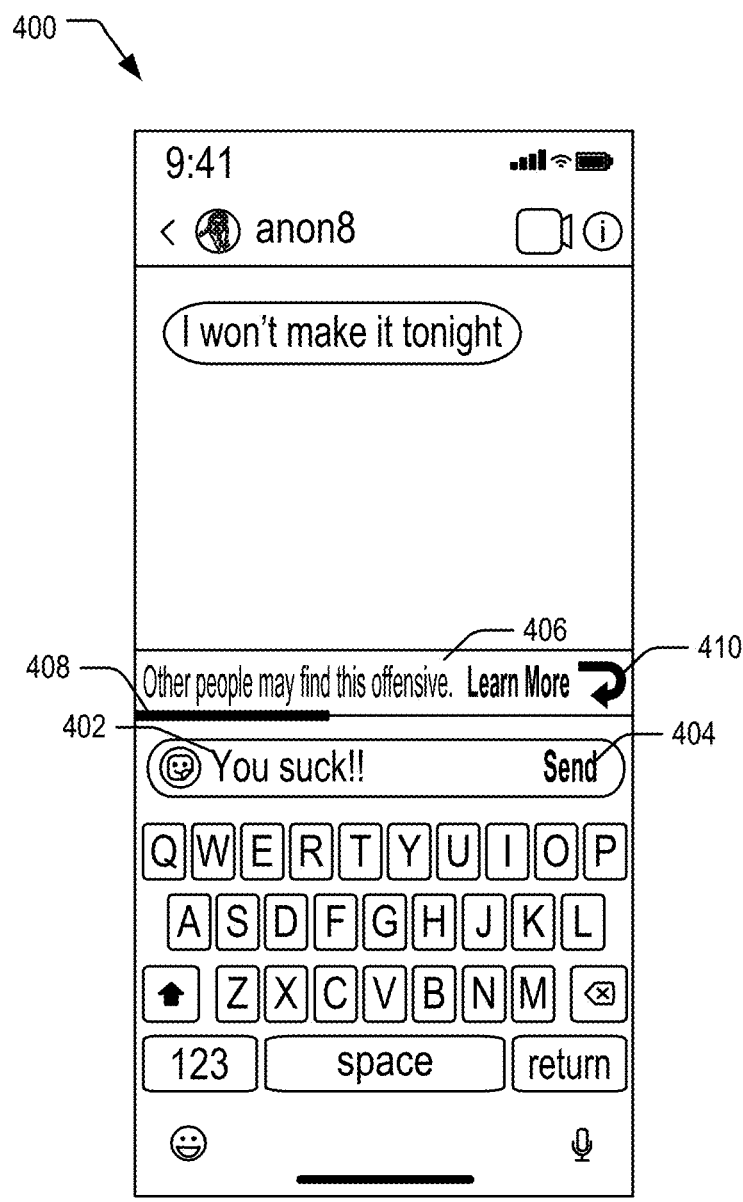
FIG. 4 illustrates an example interface usable to present a notification that is selectable to control the display of a potentially offensive message before the potentially offensive message is shared.

FIG. 4 illustrates an example interface 400 usable to present a notification that is selectable to control the display of a potentially offensive message before the potentially offensive message is shared. The message may be a direct message in a messaging or social media application, a text message, an email, an instant message, or any other message type. The example interface 400 includes an editable text input field, in which a first user has input "You suck! !" as a direct message 402 to be shared with a second user (e.g., "anon8"). In some examples, other content types may be included in a direct message, such as images, video, emojis, and so forth as described above in relation to FIG. 1.

The user interface 400 may include a selectable control 404 for sharing the direct message 402 with the second user. In examples, the social networking system may detect the potentially offensive direct message 402 prior to the direct message being shared with the second user, and provide the first user with the ability to revise and/or withdraw the direct message from being shared. For instance, when the first user selects the control 404, the direct message may be input into a machine-learned model trained to detect offensive content, such as described in relation to FIG. 1. The machine-learned model may output an offensiveness score of the direct message, and the score may be compared to a threshold corresponding to an offensiveness level of the direct message. If the score is greater than (or less than) the threshold score, the social networking system 106 of FIG. 1 may output an instruction to the computing device of the first user to display a notification 406 associated with the direct message 402 in the user interface 400, prior to the direct message being shared with the second user.

The machine-learned model may take a variety of forms, as discussed in relation to the machine-learned model 114 of FIG. 1. For instance, the machine-learned model may be an image classifier trained to identify potentially offensive images or video in the direct message 402, an audio classifier trained to identify potentially offensive sounds or speech in the direct message 402, and/or a text classifier trained to identify potentially offensive text (including text detected using OCR) in the direct message 402, to name a few examples. In cases where the direct message 402 includes different types of content (e.g., an image, a sound, a text overlay, a text-based message, and so forth), the offensiveness score may be based on combining individual scores associated with an offensiveness of each of the content types included in the direct message 402 (e.g., by summation, weighted average, etc.).

In some cases, the potentially offensive content identifiable by the machine-learned model may include different content categories, such as bullying content, hate speech content, nudity content, or others. The machine-learned model may be able to determine that the content included in the direct message 402 is a content category of the known offensive content categories. Based on determining that the direct message 402 is a content category of the known offensive content categories, the social networking system may customize the notification 406 accordingly, such as described in relation to FIGS. 3A-3C.

Similar to the discussion above in relation to FIGS. 2A-2C, in some examples the notification 406 may include text such as "Other people may find this offensive," warning the first user how other users may perceive the direct message 402 that the first user is intending to share. Additionally, in examples, the instruction to present the notification 406 may include a duration of time to present the notification 406 (e.g., 3 seconds, 5 seconds, 8 seconds, etc.) by the computing device of the first user in the user interface 400. To make the first user aware of the duration of time that the notification 406 will be displayed, a progress bar 408 or other visual timer indication may also be displayed (e.g., proximate the notification 406), visually indicating the elapsed and/or remaining duration of time that the notification 406 is displayed. Additionally, in some examples, the social networking system may prevent sharing of the direct message 402 with the second user for the duration of time that the notification 406 is displayed, such as by sending an instruction to the computing device of the first user to prevent the direct message 402 from being shared.

Although not explicitly illustrated in FIG. 4, in some cases, the direct message 402 may be shared with the second user responsive to the duration of time elapsing. By sharing the direct message 402 after a duration of time has elapsed, the techniques described herein give the first user an opportunity to reconsider sharing the potentially offensive content, but may allow the direct message 402 to be shared without the first user having to execute an additional action in the process of sharing the direct message 402 (e.g., by affirmatively selecting an additional control to share the direct message). However, examples are considered in which an affirmative control may be required to be selected by the first user to continue with posting a potentially offensive direct message 402.

Further, the social networking system may send an instruction to the computing device of the first user to present a control 410 that is usable to undo sharing the direct message 402 before the direct message 402 is shared with the second user. In some cases, the control 410 may be included as part of the notification 406 and/or displayed proximate the notification 406. In one example, the control 410, when selected, may withdraw the direct message 402 from being shared by deleting the content of the direct message 402. In some examples, selection of the control 410 may cause the direct message 402 to be returned to an editable field, where the first user may revise and/or delete the content included in the direct message 402. In this way, the first user is provided with an opportunity to make the direct message 402 more respectful after being notified that the second user may find the direct message 402 to be offensive. In some examples, the notification 406 may also include a control (in this case, denoted by "Learn More") that is usable to provide the first user with additional information about the notification 406, and may include functionality similar to the control 214 of FIG. 2.

In some cases, as discussed above in relation to FIGS. 3A-3C, multiple thresholds may be used to determine whether and how to share the direct message. For instance, content deemed to be more offensive may be prevented from being shared entirely, while content that may allow for discretion of offensiveness may prompt the notification 406 to be displayed to the first user to allow the first user to decide whether to continue with sharing the content. Additionally as described in relation to FIGS. 3A-3C, multiple machine-learned models may be used (e.g., in series) to determine whether and how to share the direct message. For instance, a first machine-learned model may be included locally in an application on the computing device of the first user that performs an initial assessment of an offensiveness level of the direct message, while a more robust machine-learned model may evaluate content more thoroughly and withdraw the content from being shared or present the first user with a notification that the content may be offensive according to the described techniques.

Figure 5:
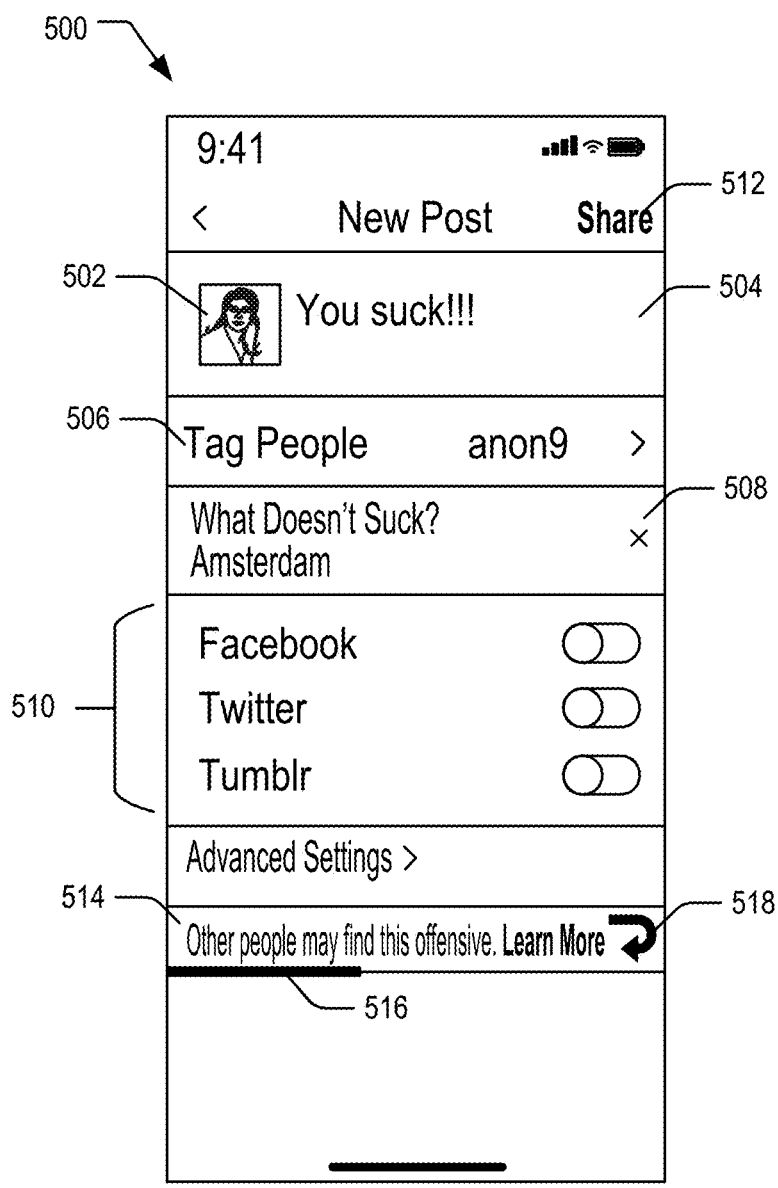
FIG. 5 illustrates an example interface usable to present a notification that is selectable to control the display of a potentially offensive profile post before the potentially offensive profile post is shared.

FIG. 5 illustrates an example interface 500 usable to present a notification that is selectable to control the display of a potentially offensive profile post before the potentially offensive profile post is shared. The example interface 500 includes an image 502 which, when shared with a first user's followers, will appear in a feed of the first user's followers. The image 502 may be selected, captured, and/or edited prior to the user interface 500 being displayed, and these prior user interface(s) are not pictured here for clarity. The example interface 500 also includes a text field 504, in which a first user has input "You suck! !" which may appear proximate the image 502 as part of the profile post. In some examples, other content types may be included in a profile post, such as multiple images, video(s), emojis, and so forth as described above in relation to FIG. 1.

Additionally, the example interface 500 includes a tag field 506, which the first user may select one or more other users to be tagged in the profile post. In this case, the first user has tagged a second user ("anon9") in the profile post. In some examples, when the second user is tagged in the profile post, other users can view that the second user has been tagged in the post (e.g., by "single tapping" the profile post), and other users may view, as part of the second user's profile, posts that the user has been tagged in. If the image 502 and/or the text field 504 associated with the profile post contains offensive content, and the second user has been tagged in the profile post by the first user, the second user may be affected by the undesirable consequences described above, such as negative feelings, embarrassment, and so forth.

The user interface 500 may include a location tag field 508 as well, which the first user may select a location that corresponds to the profile post. Oftentimes, users enjoy sharing a location where an image or video of the profile post was captured, to give reference to landmarks, restaurants, stores, and so forth. However, in some cases, a user may enter a custom, made-up location and/or a "play on words" of an actual location that, when considered in the context of the entire profile post (or on its own), may contribute to being offensive. In this case, the first user has entered a location of "What Doesn't Suck?" in the location tag field 508, which may add to the overall offensiveness of the profile post.

Further, the user interface 500 includes selectable controls 510, which allow the user to automatically share the profile post on one or more other social media platforms. In some examples, other social media platforms may not have systems in place to monitor offensive content. Therefore, by employing the techniques described herein, offensive content may be withheld and/or edited to be more respectful not only on the social media application in use, but on other social media platforms as well.

The user interface 500 may also include a selectable control 512 for sharing the profile post with the followers of the first user. In examples, the social networking system may detect the potentially offensive profile post prior to the profile post being shared with the followers of the first user, and provide the first user with the ability to revise and/or withdraw the profile post from being shared. For instance, when the first user selects the control 512, the profile post may be input into a machine-learned model trained to detect offensive content, such as described in relation to FIG. 1. The machine-learned model may output an offensiveness score of the profile post, and the score may be compared to a threshold corresponding to an offensiveness level of the profile post. If the score is greater than (or less than) the threshold score, the social networking system 106 of FIG. 1 may output an instruction to the computing device of the first user to display a notification 514 associated with the profile post in the user interface 500, prior to the profile post being shared with the followers of the first user.

The machine-learned model may take a variety of forms, as discussed in relation to the machine-learned model 114 of FIG. 1. For instance, the machine-learned model may be an image classifier trained to identify potentially offensive images or video in the profile post, an audio classifier trained to identify potentially offensive sounds or speech in the profile post, and/or a text classifier trained to identify potentially offensive text (including text detected using OCR) in the profile post, to name a few examples. In cases where the profile post includes different types of content (e.g., an image, a sound, a video, a text overlay, a text field, a user tag, a location tag, and so forth), the offensiveness score may be based on combining individual scores associated with an offensiveness of each of the content types included in the profile post (e.g., by summation, weighted average, etc.).

In some cases, the potentially offensive content identifiable by the machine-learned model may include different content categories, such as bullying content, hate speech content, nudity content, or others. The machine-learned model may be able to determine that the content included in the profile post is a content category of the known offensive content categories. Based on determining that the profile post is a content category of the known offensive content categories, the social networking system may customize the notification 514 accordingly, such as described in relation to FIGS. 3A-3C.

Similar to the discussion above in relation to FIGS. 2A-2C, in some examples the notification 514 may include text such as "Other people may find this offensive," warning the first user how other users may perceive the profile post that the first user is intending to share. Additionally, in examples, the instruction to present the notification 514 may include a duration of time to present the notification 514 (e.g., 3 seconds, 5 seconds, 8 seconds, etc.) by the computing device of the first user in the user interface 500. To make the first user aware of the duration of time that the notification 514 will be displayed, a progress bar 516 or other visual timer indication may also be displayed (e.g., proximate the notification 514), visually indicating the elapsed and/or remaining duration of time that the notification 514 is displayed. Additionally, in some examples, the social networking system may prevent sharing of the profile post with the followers of the first user for the duration of time that the notification 514 is displayed, such as by sending an instruction to the computing device of the first user to prevent the profile post from being shared.

Although not explicitly illustrated in FIG. 5, in some cases, the profile post may be shared with the followers of the first user responsive to the duration of time elapsing. By sharing the profile post after a duration of time has elapsed, the techniques described herein give the first user an opportunity to reconsider sharing the potentially offensive content, but may allow the profile post to be shared without the first user having to execute an additional action in the process of sharing the profile post (e.g., by affirmatively selecting an additional control to share the profile post). However, examples are considered in which an affirmative control may be required to be selected by the first user to continue with posting a potentially offensive profile post.

Further, the social networking system may send an instruction to the computing device of the first user to present a control 518 that is usable to undo sharing the profile post before the profile post is shared with the followers of the first user. In some cases, the control 518 may be included as part of the notification 514 and/or displayed proximate the notification 514. In one example, the control 518, when selected, may withdraw the profile post from being shared by deleting the content of the profile post. In some examples, selection of the control 518 may cause the profile post to be returned to an editable state, where the first user may revise and/or delete the content included in the profile post. In this way, the first user is provided with an opportunity to make the profile post more respectful after being notified that the one or more of the followers of the first user, and/or the second user tagged in the profile post, may find the profile post to be offensive. In some examples, the notification 514 may also include a control (in this case, denoted by "Learn More") that is usable to provide the first user with additional information about the notification 514, and may include functionality similar to the control 214 of FIG. 2.

In some cases, as discussed above in relation to FIGS. 3A-3C, multiple thresholds may be used to determine whether and how to share the profile post. For instance, content deemed to be more offensive may be prevented from being shared entirely, while content that may allow for discretion of offensiveness may prompt the notification 514 to be displayed to the first user to allow the first user to decide whether to continue with sharing the content. Additionally as described in relation to FIGS. 3A-3C, multiple machine-learned models may be used (e.g., in series) to determine whether and how to share the story. For instance, a first machine-learned model may be included locally in an application on the computing device of the first user that performs an initial assessment of an offensiveness level of the profile post, while a more robust machine-learned model may evaluate content more thoroughly and withdraw the content from being shared or present the first user with a notification that the content may be offensive according to the described techniques.

Example Methods

Various methods are described with reference to the example system of FIG. 1 for convenience and ease of understanding. However, the methods described are not limited to being performed using the system of FIG. 1 and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

Figure 6A:
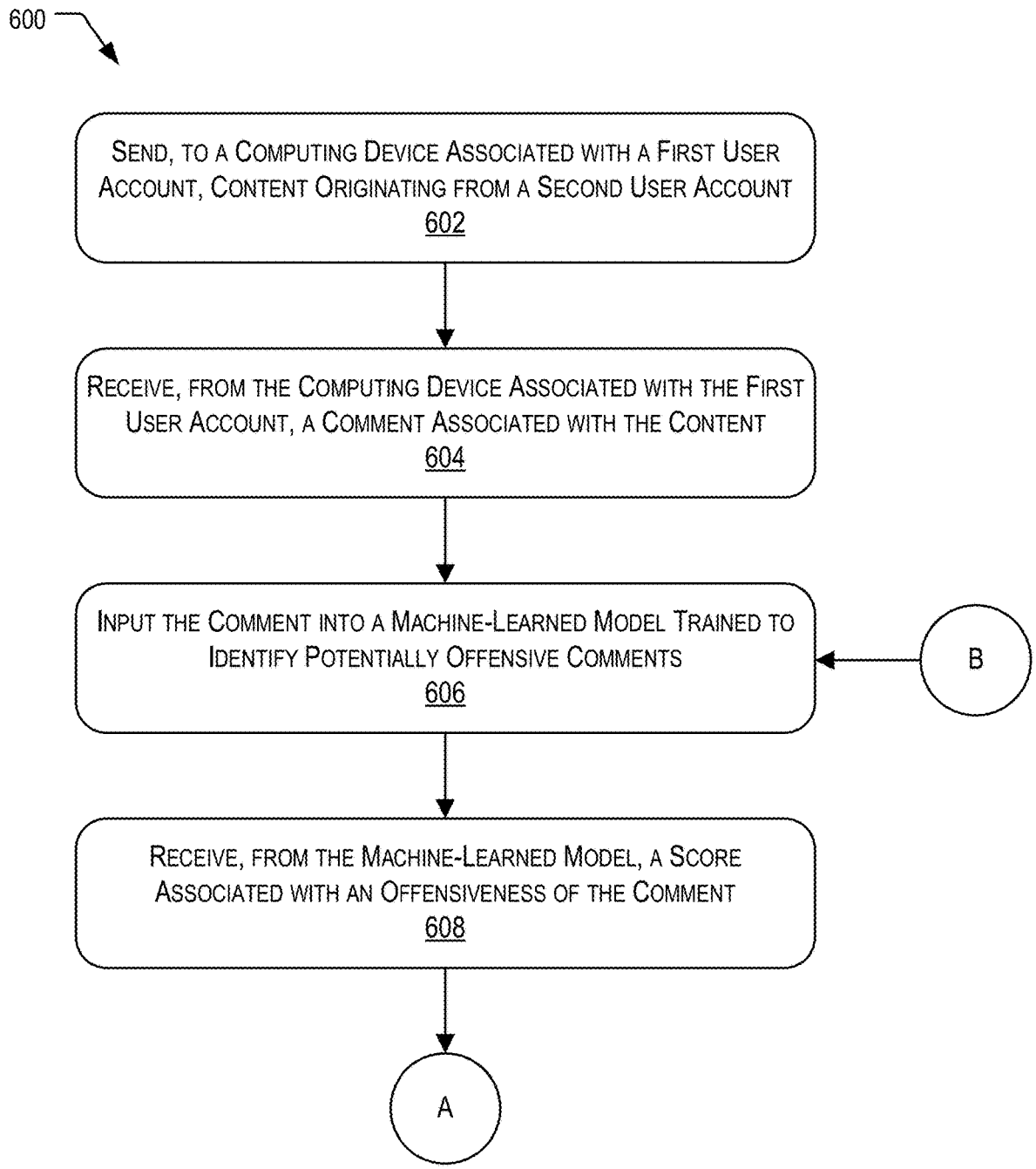
FIGS. 6A and 6B illustrate an example process for determining a potentially offensive comment being posted by a user account, and sending an instruction to present a notification associated with the potentially offensive comment to a computing device associated with the user account.
Figure 6B:
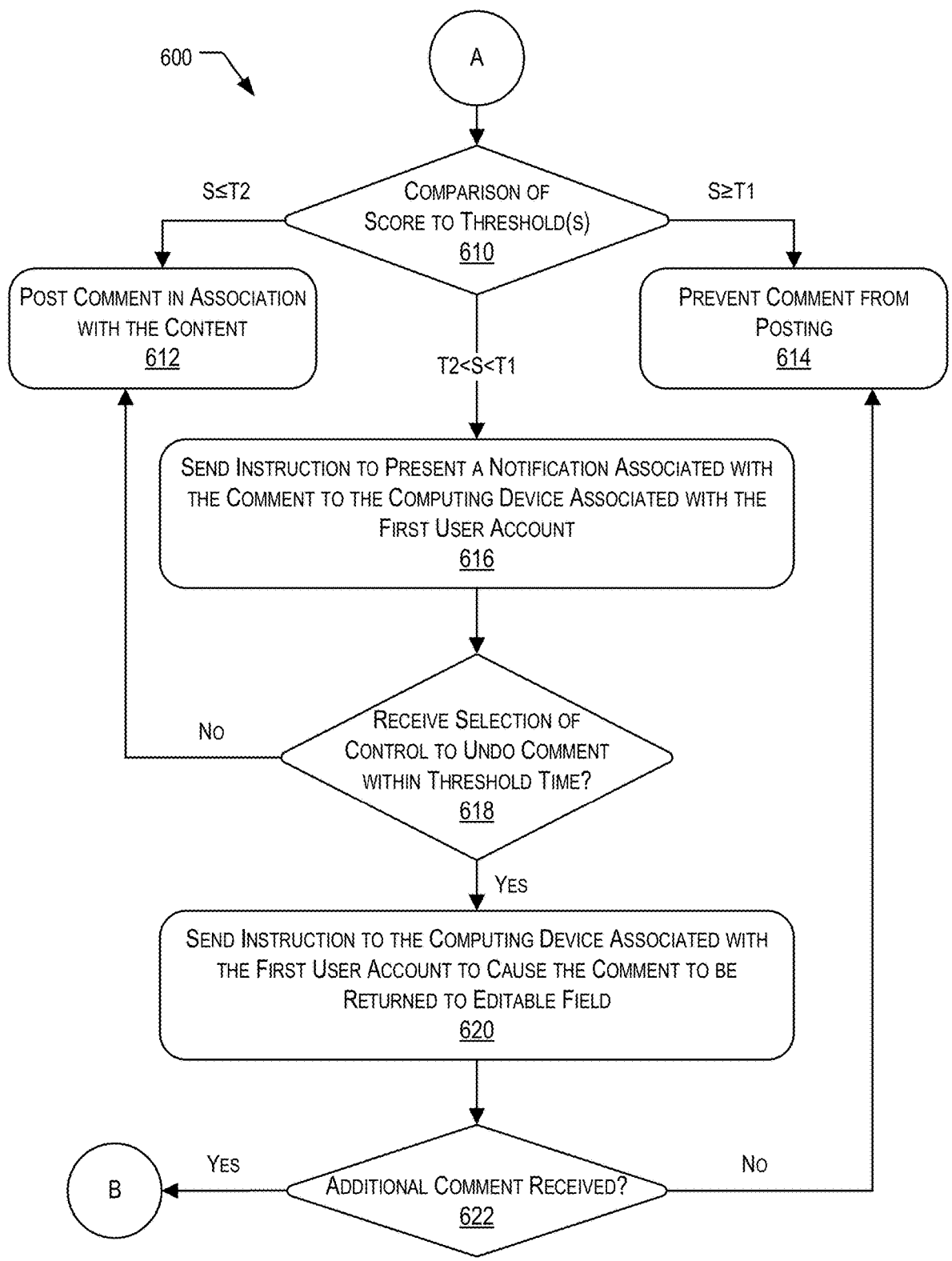

FIGS. 6A and 6B depict an example process 600 for determining a potentially offensive comment being posted by a user account, and sending an instruction to present a notification associated with the potentially offensive comment to a computing device associated with the user account.

At operation 602, the process can include sending, to a computing device associated with a first user account, content originating from a second user account. For instance, the content may be a profile post shared by the second user account with followers of the second user account, or with all users of a social networking application. In some examples, the first user may be a follower of the second user, and may receive the content in the first user's feed. In some cases, the first user may not be a follower of the second user, but instead may access the content through other means (e.g., by performing a search in which the second user is a result of the search).

At operation 604, the process can include receiving, from the computing device associated with the first user account, a comment associated with the content. In some cases, the comment may be received by the social networking system 106 prior to the comment being shared with any other users, including the second user whose content the first user is commenting on.

At operation 606, the process can include inputting the comment into a machine-learned model trained to identify potentially offensive comments. For example, the machine-learned model may be trained to identify bullying, hate speech, threats, and/or other types of potentially offensive comments.

At operation 608, the process can include receiving, from the machine-learned model, a score associated with an offensiveness of the comment. The process 600 proceeds through "A" to FIG. 6B, where at operation 610 the score is compared to one or more thresholds. In some examples, the one or more thresholds may correspond to an offensiveness level or levels (e.g., a likelihood of offensiveness, a degree of offensiveness, etc.). If the score is less than each of the one or more thresholds (e.g., the score is representative of a low likelihood that the comment is offensive), the process may proceed to operation 612, where the comment is posted in association with the content, thus making the comment viewable to other users.

If the score is greater than a first threshold score, the process may proceed to operation 614, in which the comment is prevented from being posted. The first threshold score may correspond to a high offensiveness level (e.g., certain that the content is offensive). In some examples, although the comment may be prevented from being posted if the score is higher than the first threshold score, a notification may be output at the computing device associated with the first user account to notify the user that the comment was determined to be offensive, thus allowing the user to resubmit a comment that may be more respectful.

If the score is greater than a second threshold score, but less than the first threshold score, the process may proceed to operation 616 in which an instruction is sent to the computing device associated with the first user account to present a notification associated with the comment. In some examples, the notification may advise the user that the comment is likely to be offensive to other users, give the user more information about offensive content, and/or provide the user with selectable controls to undo posting and/or revise the comment as described herein. Additionally, in some cases, the notification may be presented for an amount of time (e.g., 3 seconds, 5 seconds, 8 seconds, etc.) allowing the user to undo posting and/or revise the comment before the comment is posted. During the amount of time, the comment may be in a "pending" state, in which it is not posted for other users to view.

For instance, at operation 618, the process can include determining whether selection of a control to undo the comment within a threshold amount of time has been received. If the selection of the control to undo posting of the comment is not received within the threshold amount of time, the process may return to operation 612, where the comment is posted in association with the content, making the comment viewable by other users. On the other hand, if selection of the control is received within the threshold amount of time, the process can proceed to operation 620, in which an instruction is sent to the computing device associated with the first user account to cause the comment to be returned to an editable field (e.g., a text editing field). In this way, the user may edit the comment to be more respectful, and/or withdraw the comment from being posted for other users to view.

At operation 622, the process can include determining whether an additional comment is received. If an additional comment is received, the process may return through "B" to operation 606 where the additional comment is input into the machine-learned model trained to identify potentially offensive comments. If an additional comment is not received, the process may return to operation 614, where the original comment is prevented from being posted, and may be deleted from the social networking system.

Figure 7A:
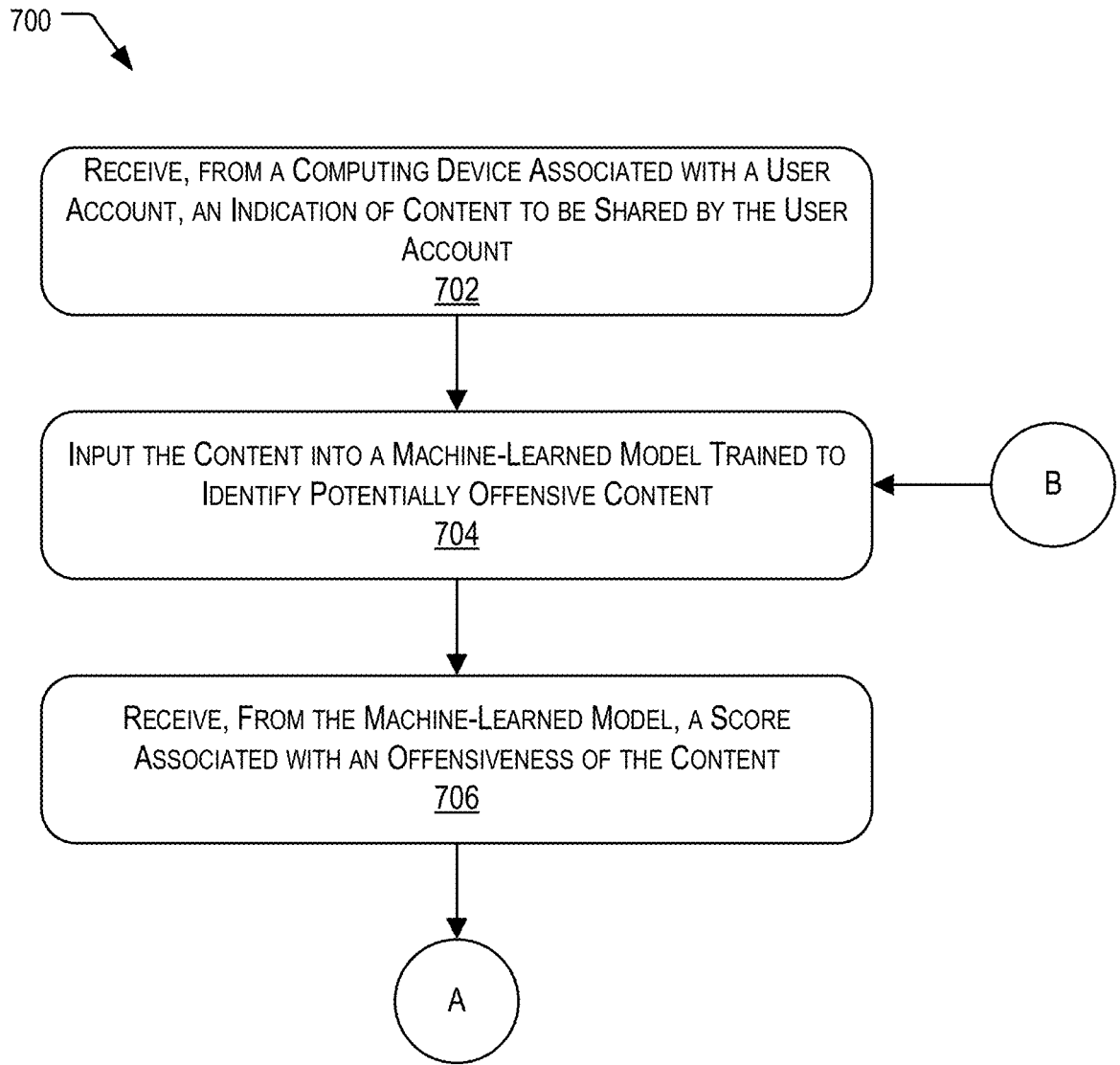
FIGS. 7A and 7B illustrate an example process for determining potentially offensive content being posted by a user account, and sending an instruction to present a notification associated with the potentially offensive content to a computing device associated with the user account.
Figure 7B:
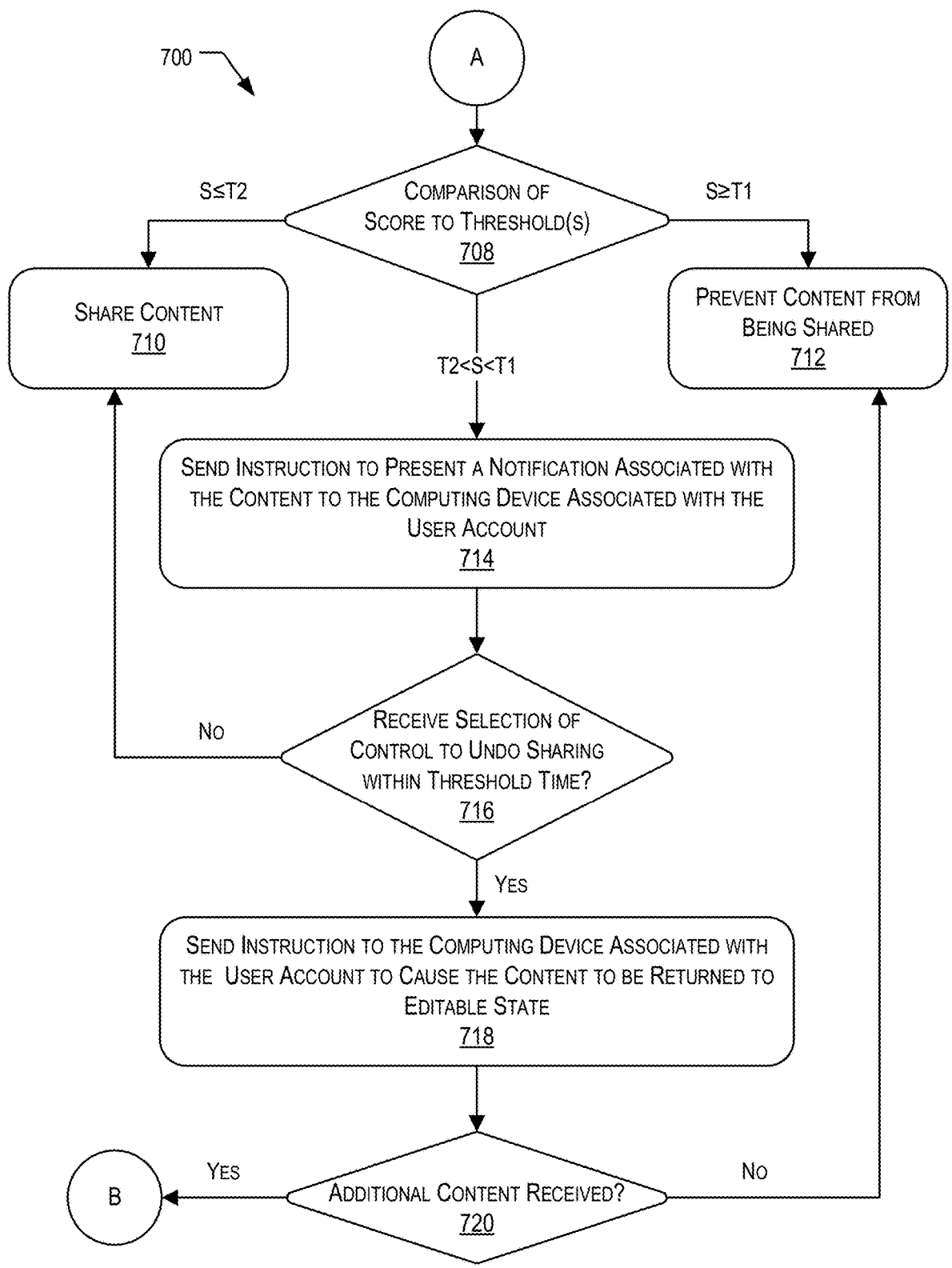

FIGS. 7A and 7B depict an example process 700 for determining potentially offensive content being posted by a user account, and sending an instruction to present a notification associated with the potentially offensive content to a computing device associated with the user account.

At operation 702, the process can include receiving, from a computing device associated with a user account, an indication of content to be shared by the user account. In some examples, the content to be shared by the user account may be a profile post, a story, and/or a direct message to one or more other users.

At operation 704, the process can include inputting the content into a machine-learned model trained to identify potentially offensive content. For example, the machine-learned model may be an image classifier trained to identify potentially offensive images or video in the content, an audio classifier trained to identify potentially offensive sounds or speech in the content, and/or a text classifier trained to identify potentially offensive text (including text detected using OCR) in the content, to name a few examples. In cases where the content includes different types of content (e.g., an image, a sound, a text overlay, a tag, a GIF, and so forth), the offensiveness score may be based on combining individual scores associated with an offensiveness of each of the content types included in the content (e.g., by summation, weighted average, etc.).

At operation 706, the process can include receiving, from the machine-learned model, a score associated with an offensiveness of the content. The process 700 proceeds through "A" to FIG. 7B, where at operation 708 the score is compared to one or more thresholds. In some examples, the one or more thresholds may correspond to an offensiveness level or levels (e.g., a likelihood of offensiveness, a degree of offensiveness, etc.). If the score is less than each of the one or more thresholds (e.g., the score is representative of a low likelihood that the content is offensive), the process may proceed to operation 710, where the content is shared, thus making the content viewable to other users according to the type of content as described herein.

If the score is greater than a first threshold score, the process may proceed to operation 712, in which the content is prevented from being shared. The first threshold score may correspond to a high offensiveness level (e.g., certain that the content is offensive). In some examples, although the content may be prevented from being shared if the score is higher than the first threshold score, a notification may be output at the computing device associated with the user account to notify the user that the comment was determined to be offensive, thus allowing the user to resubmit content that may be more respectful.

If the score is greater than a second threshold score, but less than the first threshold score, the process may proceed to operation 714 in which an instruction is sent to the computing device associated with the user account to present a notification associated with the content. In some examples, the notification may advise the user that the content is likely to be offensive to other users, give the user more information about offensive content, and/or provide the user with selectable controls to undo sharing and/or revise the content as described herein. Additionally, in some cases, the notification may be presented for an amount of time (e.g., 3 seconds, 5 seconds, 8 seconds, etc.) allowing the user to undo sharing and/or revise the content before the content is shared. During the amount of time, the content may be in a "pending" state, in which it is not shared with other users to view and/or consume.

For instance, at operation 716, the process can include determining whether selection of a control to undo sharing the content within a threshold amount of time has been received. If the selection of the control to undo sharing of the content is not received within the threshold amount of time, the process may return to operation 612, where the content is shared according to the type of content as described herein, making the content available to consume by other users. On the other hand, if selection of the control is received within the threshold amount of time, the process can proceed to operation 620, in which an instruction is sent to the computing device associated with the user account to cause the content to be returned to an editable state (e.g., a text editing field, an image editing interface, a video editing interface, a sound editing interface, etc.). In this way, the user may edit the content to be more respectful, and/or withdraw the content from being shared for other users to consume.

At operation 720, the process can include determining whether additional content is received. If additional content is received, the process may return through "B" to operation 704 where the additional content is input into the machine-learned model trained to identify potentially offensive content. If additional content is not received, the process may return to operation 712, where the original content is prevented from being posted, and may be deleted from the social networking system.

Figure 8:
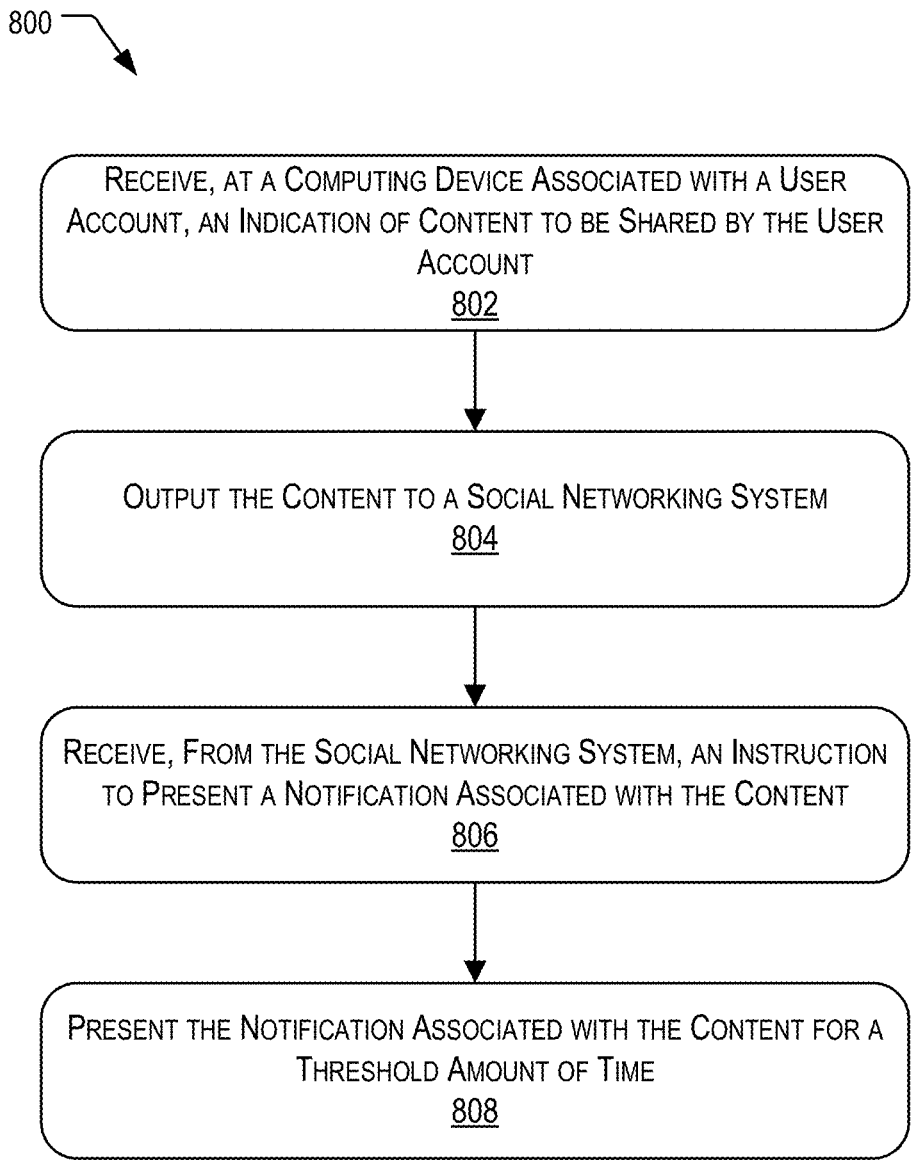
FIG. 8 illustrates an example process for presenting a notification associated with potentially offensive content.

FIG. 8 is an example process 800 for presenting a notification associated with potentially offensive content.

At operation 802, the process can include receiving, at a computing device associated with a user account, an indication of content to be shared by the user account. For instance, the user account may be associated with a social networking application being executed by the computing device. In some examples, the content to be shared may be a profile or feed post, a story, a message, a comment on another user's shared content, or other type of content as described herein.

At operation 804, the process can include outputting the content to a social networking system. In some examples, the social networking system may include another computing device that is remotely located from the computing device associated with the user account, and the content is output over a network to the computing device of the social networking system.

At operation 806, the process can include receiving, from the social networking system, an instruction to present a notification associated with the content. In some examples, the notification may advise the user that the content is likely to be offensive to other users, give the user more information about offensive content, and/or provide the user with selectable controls to undo sharing and/or revise the content as described herein. At operation 808, the process can include presenting the notification associated with the content for a threshold amount of time. In examples, the notification may be presented for an amount of time (e.g., 3 seconds, 5 seconds, 8 seconds, etc.), and may include selectable controls that allow the user to undo sharing and/or revise the content before the content is shared, as described herein. During the amount of time, the content may be in a "pending" state, in which it is not shared with other users to view and/or consume.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example System and Device

Figure 9:
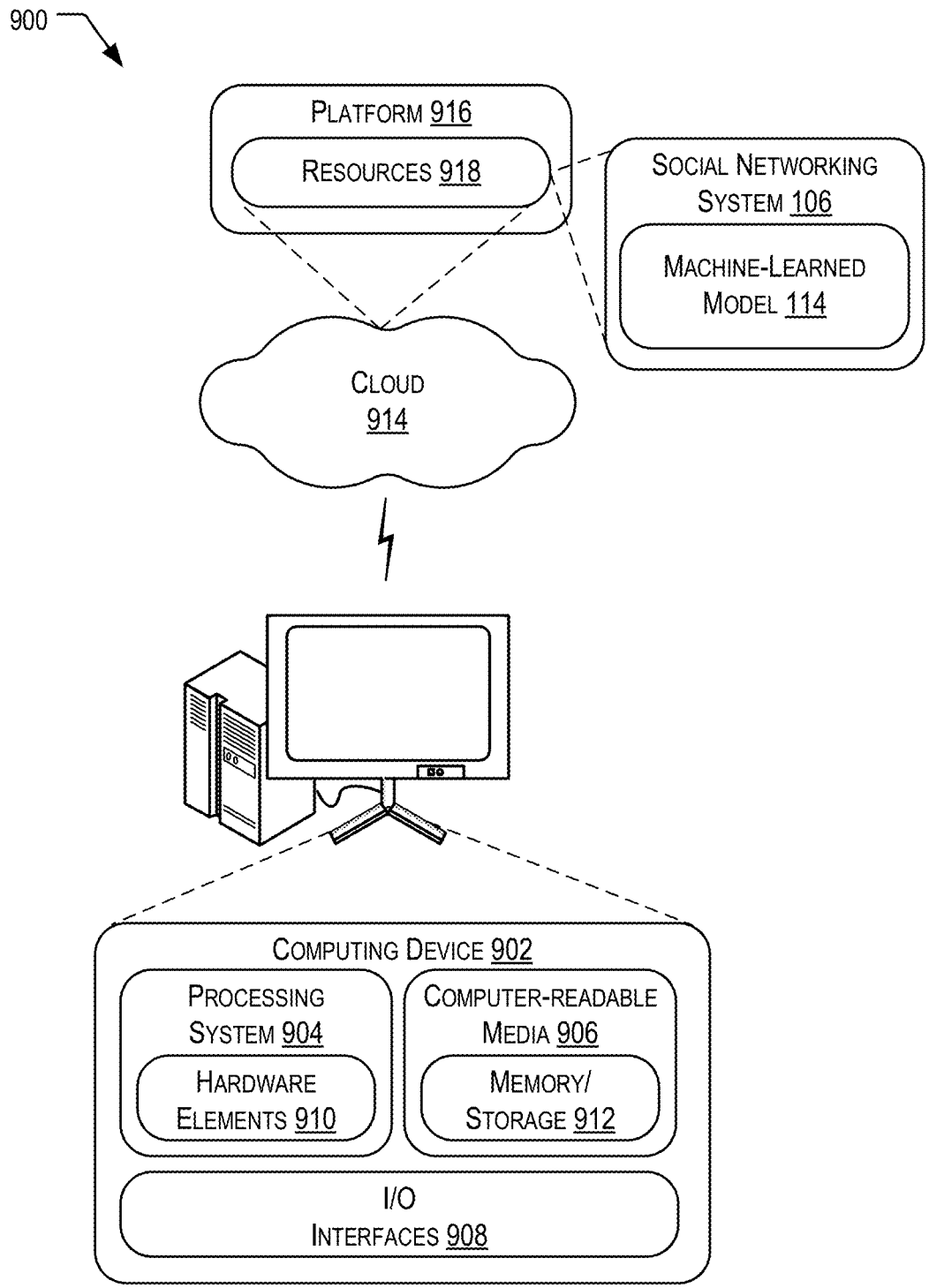
FIG. 9 illustrates an example system and device which may be used to implement the techniques described herein.

FIG. 9 illustrates an example system generally at 900 that includes an example computing device 902 that is representative of one or more computing systems and/or devices that may implement the various techniques described herein. This is illustrated through inclusion of the social networking system 106 configured to output an instruction to present a notification of offensive content to a computing device associated with a user account, and the machine-learned model 114 trained to detect offensive content. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 902. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 902, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 910 and computer-readable media 906 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also be scalable to provide a corresponding level of scale to encountered demand for the resources 918 that are implemented via the platform 916. Accordingly, in an interconnected device embodiment, implementation of functionality described herein may be distributed throughout multiple devices of the system 900. For example, the functionality may be implemented in part on the computing device 902 as well as via the platform 916 which may represent a cloud computing environment 914.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, from a computing device associated with a user account, content to be shared by the user account;
inputting the content into a machine-learned model trained to identify potentially offensive content;
receiving, from the machine-learned model, a score associated with an offensiveness of the content;
comparing the score to a threshold score corresponding to an offensiveness level;
sending, to the computing device associated with the user account and based at least in part on the score being greater than the threshold score, an instruction to present a notification associated with the content for a duration of time;
withholding the content from being transmitted by the user account for the duration of time; and
transmitting the content based at least in part on the duration of time elapsing.

2. The method of claim 1, wherein the content comprises at least a portion of a profile post, a story, or a direct message.

3. The method of claim 1, wherein the instruction is a first instruction, the method further comprising sending, to the computing device associated with the user account, a second instruction to present a control usable to undo sharing the content.

4. The method of claim 1, wherein the potentially offensive content identifiable by the machine-learned model comprises content types including bullying content, hate speech content, or nudity content, the method further comprising:
determining that the content is a content type of the content types,
wherein the instruction to present the notification is further based at least in part on the content type of the content.

5. The method of claim 1, wherein the machine-learned model comprises an image classifier trained to identify potentially offensive images or video.

6. The method of claim 1, wherein the machine-learned model comprises an audio classifier trained to identify potentially offensive sounds or speech.

7. The method of claim 1, wherein the machine-learned model comprises a text classifier trained to identify potentially offensive text.

8. The method of claim 7, wherein the machine-learned model further comprises an optical character recognition (OCR) layer to identify the potentially offensive text depicted in an image or a video.

9. The method of claim 1, wherein the user account is a first user account, the method further comprising determining a second user account associated with the content,
wherein the instruction to present the notification is based at least in part on the second user account being associated with the content.

10. A system comprising:
one or more processors; and
computer-readable media storing instructions that, when executed by the one or more processors, cause the system to perform operations comprising:
receiving, from a computing device associated with a user account, content to be shared by the user account, the content comprising two or more content categories, the content categories including an image, a video, a sound, or text;
inputting the content into a machine-learned model trained to identify potentially offensive content;
receiving, from the machine-learned model, a score associated with an offensiveness of the content, the score based at least in part on combining individual scores associated with an offensiveness of individual ones of the two or more content categories included in the content;
comparing the score to a threshold score corresponding to an offensiveness level; and
sending, to the computing device associated with the user account and based at least in part on the score being greater than the threshold score, an instruction to present a notification associated with the content.

11. The system of claim 10, wherein the content is a profile post, a story, or a direct message comprising the two or more content categories.

12. The system of claim 10, wherein the instruction to present the notification includes a duration of time to present the notification.

13. The system of claim 12, the operations further comprising sharing the content responsive to the duration of time elapsing.

14. The system of claim 12, wherein the instruction to present the notification further instructs the computing device associated with the user account to display a visual indicator to indicate the duration of time.

15. The system of claim 10, wherein the instruction is a first instruction, the operations further comprising sending, to the computing device associated with the user account, a second instruction to display the content in a pending state for a duration of time.

16. The system of claim 10, wherein the instruction is a first instruction, the operations further comprising sending, to the computing device associated with the user account, a second instruction to present a control usable to undo sharing the content.

17. One or more computer-readable media storing instructions that, when executed by one or more processors of a server computing device, cause the server computing device to perform operations comprising:
receiving, from a computing device associated with a user account, content to be shared by the user account;
inputting the content into a machine-learned model trained to identify potentially offensive content;
receiving, from the machine-learned model, a score associated with an offensiveness of the content;
comparing the score to a first threshold score corresponding to a first offensiveness level;
preventing the content from being sent based at least in part on the score being greater than the first threshold score;
comparing the score to a second threshold score corresponding to a second offensiveness level; and
sending, to the computing device associated with the user account, an instruction to present a notification associated with the content based at least in part on the score being less than the first threshold score and greater than the second threshold score.

18. The one or more computer-readable media of claim 17,
wherein the notification includes a control usable to undo sharing the content based at least in part on the score being less than the first threshold score and greater than the second threshold score.

19. The one or more computer-readable media of claim 17, wherein the computing device is a first computing device, the user account is a first user account, the machine-learned model is a first machine-learned model, and the score is a first score, the operations further comprising:

permitting the content to be shared with a second computing device associated with a second user account;

inputting the content into a second machine-learned model trained to identify the potentially offensive content;

receiving, from the machine-learned model, a second score associated with the offensiveness of the content; and withdrawing the content from being shared with the second computing device associated with the second user account based at least in part on the second score.

20. The one or more computer-readable media of claim 17, wherein the content comprises a profile post, a story, or a direct message.

\* \* \* \* \*